US012645638B2

(12) United States Patent
Jagasia et al.

(10) Patent No.: US 12,645,638 B2
(45) Date of Patent: ***Jun. 2, 2026

(54) TRANSACTION-LEVEL DATA RETENTION POLICY INHERITANCE

(71) Applicant: Palantir Technologies Inc., Denver, CO (US)

(72) Inventors: Arnav Jagasia, New York, NY (US); Ashley Meuser, Arlington, VA (US); Hugo Dobbelaere, Paris (FR); Mihir Patil, Cupertino, CA (US); Sam Stoll, London (GB); Pieris Christofi, Oxford (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/965,516

(22) Filed: Dec. 2, 2024

(65) Prior Publication Data

US 2025/0156373 A1     May 15, 2025

Related U.S. Application Data

(63) Continuation of application No. 18/307,553, filed on Apr. 26, 2023, now Pat. No. 12,197,385.

(Continued)

(51) Int. Cl.
*G06F 16/11* (2019.01)
*G06F 16/16* (2019.01)

(52) U.S. Cl.
CPC .......... *G06F 16/125* (2019.01); *G06F 16/162* (2019.01)

(58) Field of Classification Search
CPC ............................ G06F 16/125; G06F 16/162
See application file for complete search history.

(56) References Cited

U.S. PATENT DOCUMENTS

| | | |
|---|---|---|
| 12,197,385 B2 | 1/2025 | Jagasia et al. |
| 2005/0234931 A1 | 10/2005 | Yip et al. |

(Continued)

FOREIGN PATENT DOCUMENTS

| | | |
|---|---|---|
| EP | 4 276 647 | 11/2023 |

OTHER PUBLICATIONS

U.S. Appl. No. 18/307,553, Transation-Level Data Rtention Policy Inheritance, filed Apr. 26, 2023.

(Continued)

*Primary Examiner* — Tarek Chbouki
(74) *Attorney, Agent, or Firm* — Knobbe, Martens, Olson & Bear, LLP

(57) ABSTRACT

A computer system provides transaction-level data retention policy inheritance. The system may perform operations including storing a first dataset comprising a plurality of transactions, each of the plurality of transactions comprising one or more data items; receiving a first transaction to the first dataset, the first transaction comprising one or more data items; determining a first retention policy for the first transaction; and storing the first retention policy with the first transaction. The system may further perform operations including calculating a deletion date for the first transaction based on the first retention policy; and storing the deletion date with the first transaction in the first dataset.

20 Claims, 14 Drawing Sheets

Related U.S. Application Data

(60) Provisional application No. 63/363,865, filed on Apr. 29, 2022, provisional application No. 63/431,913, filed on Dec. 12, 2022, provisional application No. 63/359,044, filed on Jul. 7, 2022.

(56) References Cited

U.S. PATENT DOCUMENTS

| | | | |
|---|---|---|---|
| 2013/0066948 A1 | 3/2013 | Colrain et al. | |
| 2019/0311563 A1 | 10/2019 | O'Neill et al. | |
| 2020/0160439 A1* | 5/2020 | Carroll | H04L 63/08 |
| 2020/0372517 A1 | 11/2020 | Malkin | |
| 2021/0096957 A1 | 4/2021 | Rahman et al. | |
| 2021/0256027 A1 | 8/2021 | Murao et al. | |
| 2023/0079548 A1 | 3/2023 | Landers | |
| 2023/0350843 A1 | 11/2023 | Jagasia et al. | |
| 2023/0418747 A1 | 12/2023 | Arora et al. | |

OTHER PUBLICATIONS

Lu et al., "Auditing a Database Under Retention Restrictions", IEEE International Conference on Data Engineering, 2009, pp. 42-53.
Official Communication for European Patent Application No. 23170633.4 dated Oct. 16, 2023, 8 pages.

* cited by examiner

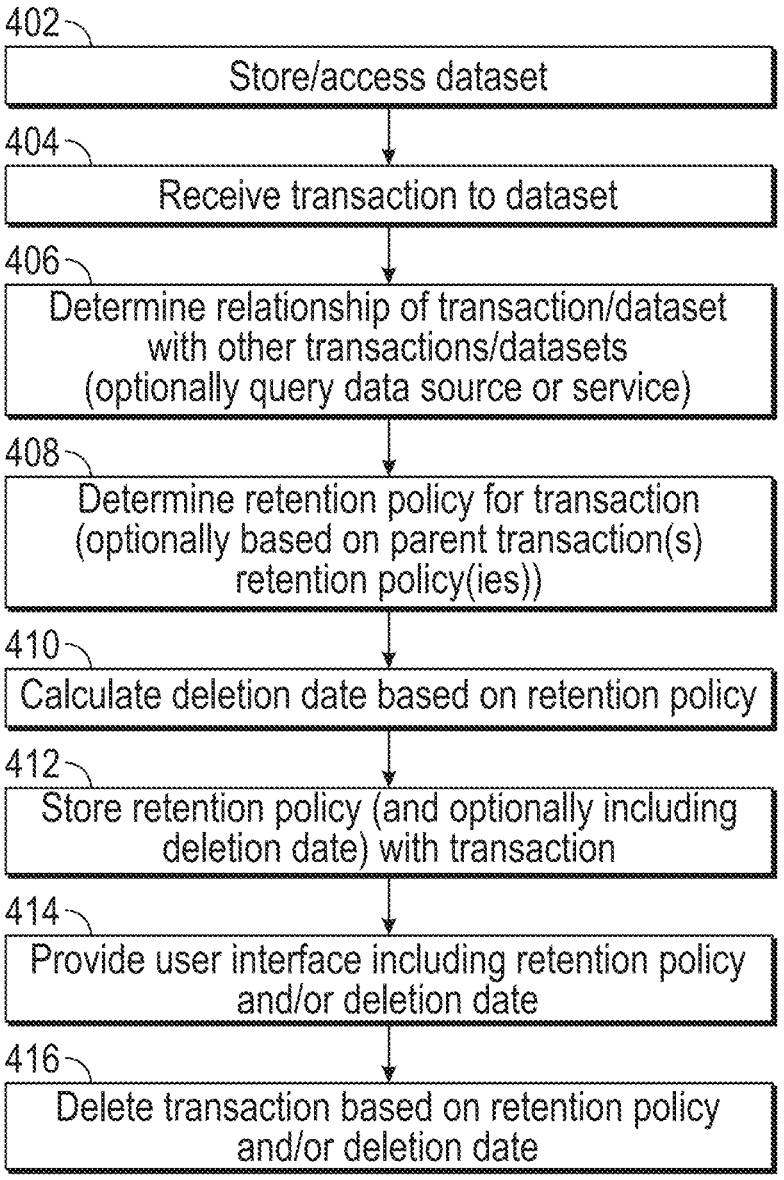

402 — Store/access dataset

404 — Receive transaction to dataset

406 — Determine relationship of transaction/dataset
with other transactions/datasets
(optionally query data source or service)

408 — Determine retention policy for transaction
(optionally based on parent transaction(s)
retention policy(ies))

410 — Calculate deletion date based on retention policy

412 — Store retention policy (and optionally including
deletion date) with transaction 414 — Provide user interface including retention policy
and/or deletion date 416 — Delete transaction based on retention policy
and/or deletion date

FIG. 4A

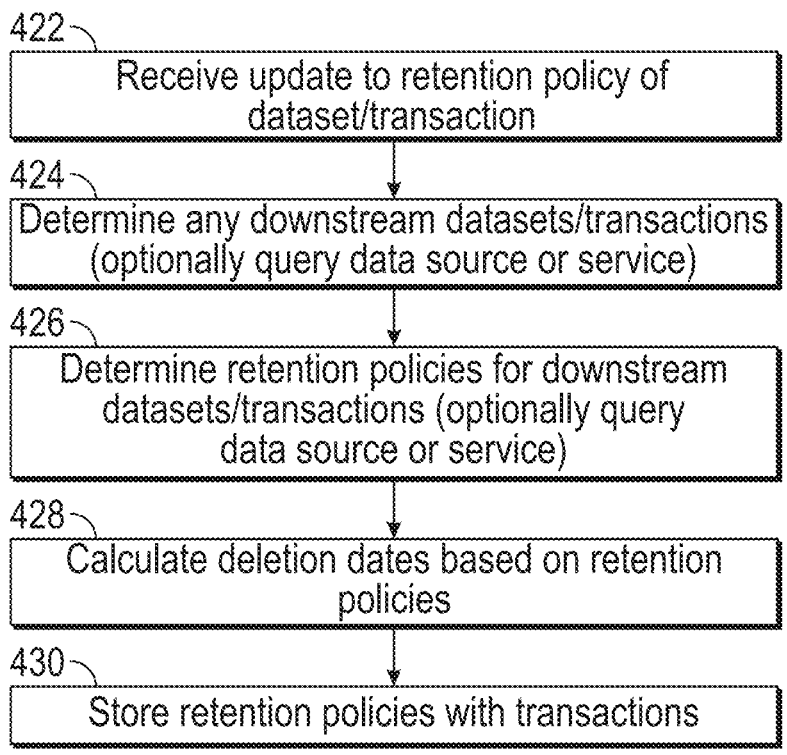

422 — Receive update to retention policy of dataset/transaction

424 — Determine any downstream datasets/transactions (optionally query data source or service)

426 — Determine retention policies for downstream datasets/transactions (optionally query data source or service)

428 — Calculate deletion dates based on retention policies

430 — Store retention policies with transactions

FIG. 4B

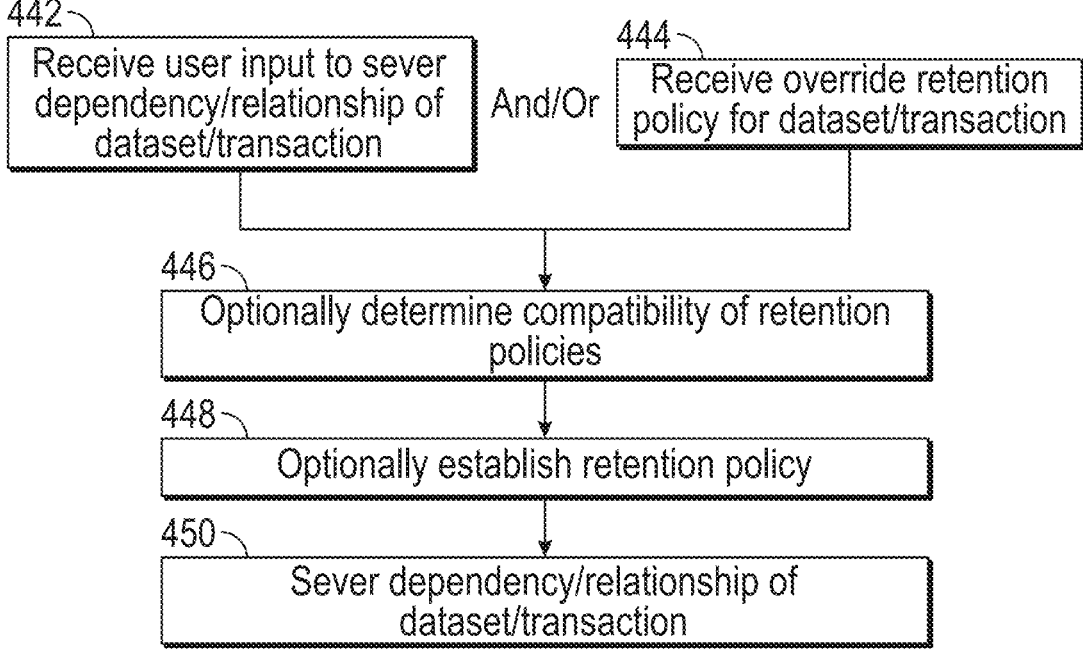

442 — Receive user input to sever dependency/relationship of dataset/transaction          And/Or          444 — Receive override retention policy for dataset/transaction 446 — Optionally determine compatibility of retention policies 448 — Optionally establish retention policy 450 — Sever dependency/relationship of dataset/transaction

Create retention policy                                                    ×

Name (required)

Description

Retention policy type (required)

| Time to Live | Fixed deletion date |
|---|---|

Name (required)

| 5 | ⌃⌄ | Days ⊜ |
|---|---|---|

☉ Create retention policy

Figure 5C:
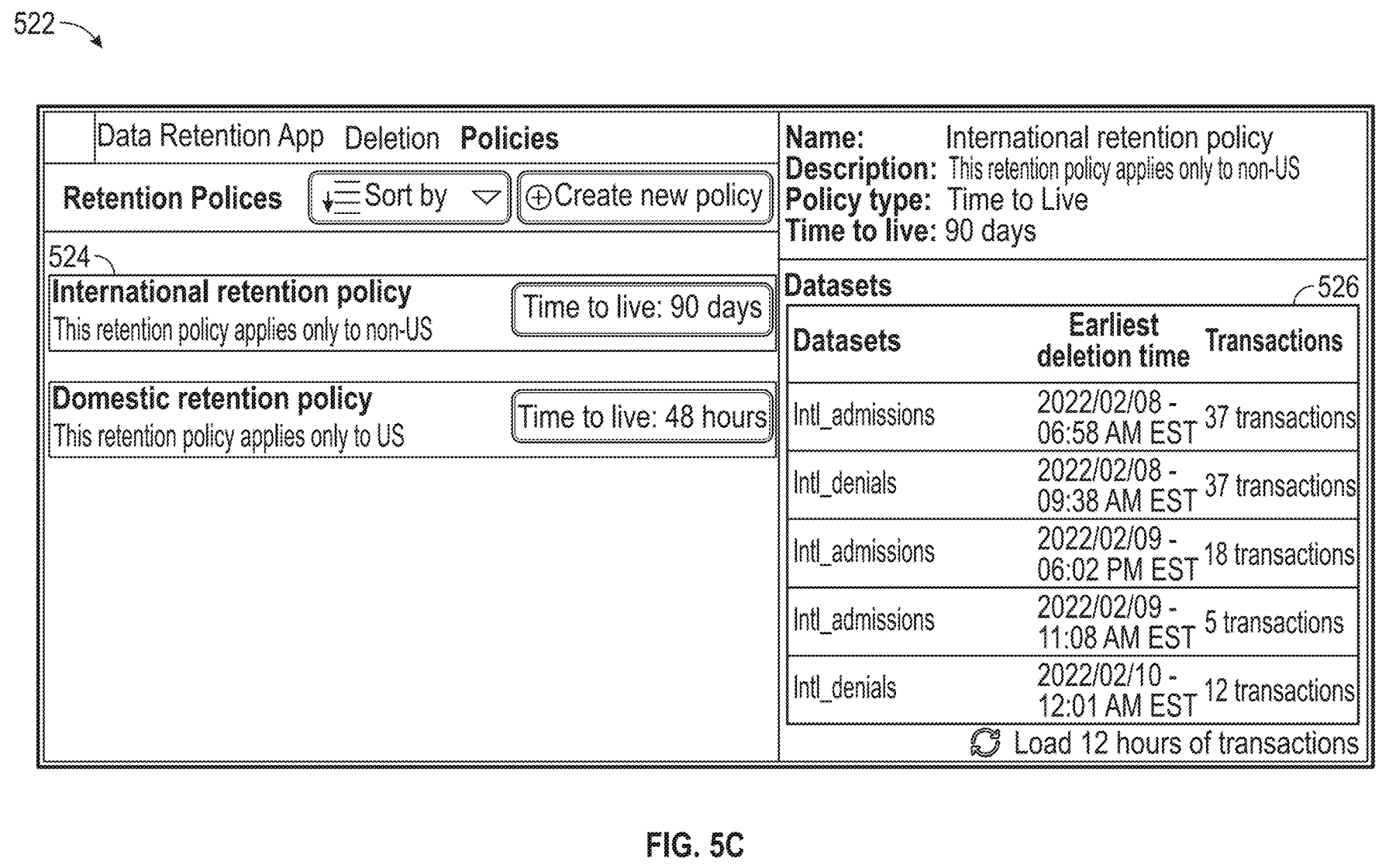

| Data Retention App  Deletion  Policies | |
| --- | --- |

Retention Polices  | ☰ Sort by ▽ |  ⊕ Create new policy

524 —

International retention policy | Time to live: 90 days
This retention policy applies only to non-US

Domestic retention policy | Time to live: 48 hours
This retention policy applies only to US

---

Name: International retention policy
Description: This retention policy applies only to non-US
Policy type: Time to Live
Time to live: 90 days

Datasets    526

| Datasets | Earliest deletion time | Transactions |
| --- | --- | --- |
| Intl_admissions | 2022/02/08 - 06:58 AM EST | 37 transactions |
| Intl_denials | 2022/02/08 - 09:38 AM EST | 37 transactions |
| Intl_admissions | 2022/02/09 - 06:02 PM EST | 18 transactions |
| Intl_admissions | 2022/02/09 - 11:08 AM EST | 5 transactions |
| Intl_denials | 2022/02/10 - 12:01 AM EST | 12 transactions |

↻ Load 12 hours of transactions

Data Retention App  Deletion  Policies

| Dataset name | Earliest deletion date | Transactions to delete | Current retention policy | Inherited/ Overridden |
|---|---|---|---|---|
| Intl_admissions /dataset A/admissions/intl/intl_admissions | 2022/02/05 12:01 AM EST | 37 transactions | | Inherited |
| Intl_denials /dataset B/denials/intl/intl_admissions | 2022/02/05 12:01 AM EST | 37 transactions | Intl retention policy Time to live: 90 days | Inherited |
| Admissions /dataset C/admissions/intl/intl_admissions | 2022/02/06 09:02 PM EST | 18 transactions | Intl retention policy Time to live: 90 days | No |
| Admissions /dataset D/admissions/us_admissions | 2022/02/06 09:05 PM EST | 12 transactions | Domestic retention policy Time to live: 90 days | No |
| Intl_admissions /dataset E/admissions/intl/intl_admissions | 2022/02/08 06:58 AM EST | 5 transactions | Intl retention policy Time to live: 90 days | Inherited |
| Intl_denials /dataset F/denials/intl/intl_admissions | 2022/02/06 09:02 PM EST | 18 transactions | Intl retention policy Time to live: 90 days | Inherited |
| Intl_denials /dataset G/denials/intl/intl_denials | 2022/02/06 09:05 PM EST | 12 transactions | Intl retention policy Time to live: 90 days | Overridden |

Load an additional 12 hours

TRANSACTION-LEVEL DATA RETENTION POLICY INHERITANCE

CROSS-REFERENCE TO RELATED APPLICATIONS

This application is a continuation of U.S. patent application Ser. No. 18/307,553, filed Apr. 26, 2023, and titled "TRANSACTION-LEVEL DATA RETENTION POLICY INHERITANCE," which claims benefit of U.S. Provisional Patent Application No. 63/363,865, filed Apr. 29, 2022, and titled "TRANSACTION-LEVEL DATA RETENTION POLICY INHERITANCE," U.S. Provisional Patent Application No. 63/359,044, filed Jul. 7, 2022, and titled "SYSTEMS AND METHODS FOR LINEAGE-AWARE RETENTION," and U.S. Provisional Patent Application No. 63/431,913, filed Dec. 12, 2022, and titled "SYSTEMS AND METHODS FOR LINEAGE-AWARE RETENTION." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for managing retention policies of electronic data assets. More specifically, the present disclosure includes transaction-level data retention policy inheritance for related datasets.

BACKGROUND

A background is provided for introductory purposes and to aid the reader in understanding the detailed description. The background should not be taken as an admission of any prior art to the claims.

Data deletion policies in large-scale data systems generally include instructions for deletion of datasets based on some criteria. However, in such systems raw data tends to quickly proliferate in original or derivative formats and copies, with each potentially involving combinations with other data.

SUMMARY

The systems, methods, and devices described herein each have several aspects, no single one of which is solely responsible for its desirable attributes. Without limiting the scope of this disclosure, several non-limiting features will now be described briefly.

While privacy legislation highlights the importance of deleting data, respecting personal data deletion policies in large-scale data systems is technically complex and cumbersome. A successful deletion solution should find every instance of sensitive data across multiple transformations and combinations of the data. However, in such systems raw data tends to quickly proliferate in original or derivative formats and copies, with each potentially involving combinations with other data. Accordingly, while the system should respect the deletion period according to the purposes of collection of the original raw data, the deletion periods and relevant related data become ever more difficult to determine and account for with each data transformation due, in part, to attenuation and/or distance from the original raw data.

The present disclosure includes a data management system and related processes and functionality that can provide transaction-level data retention policy inheritance. The data management system of the present disclosure can advantageously manage retention policies for datasets of the system, including at the transaction level, while further accounting for the "lineage" of each dataset and transaction. Thus, while raw data may be transformed, derived, copied, and/or the like, within the system, the system can still provide technically robust data retention policies and deletion periods, via inheritance of data retention policies, according to the purposes of collection of the original raw data.

As data moves through the system, the system can keep track of the lineage, or parent-child relationships, of the datasets, transactions, and/or data items. Accordingly, the system can advantageously be "lineage-aware". This lineage awareness can advantageously allow the system to provide technically robust data retention policies and deletion periods, via inheritance of data retention policies, based on the lineage of datasets and/or transactions. Thus, for example, when a deletion period of an upstream dataset or transaction has been satisfied, the system can robustly also delete downstream datasets or transactions according to the deletion period, if appropriate.

The system can advantageously provide management of retention policies at the dataset level, but also at more granular levels such as the transaction-level and the data item-level. Data retention policies at the transaction-level can, for example, be particularly advantageous for dynamic datasets such as described above. For example, in the instance in which data is added to a dataset at a regular cadence (e.g., additional test results are regularly added to the dataset), older data (e.g., older test results) may not need to be kept long into the future. Accordingly, it may be desirable to delete data from earlier transactions to the dataset, while keeping data from more recent transactions to the dataset. Such deletions of data from older transactions may be performed on a rolling basis, by respecting retention polices associated with each individual transaction to the dataset. The transaction-level retention policy functionality of the system of the present disclosure can advantageously enable such deletions of earlier data/transactions, while maintaining later data/transactions according to separate retention policies. In various implementations, retention policies may be set at the dataset-level and/or the transaction-level. Even when set at the dataset-level, however, the system may apply the retention policies at the transaction-level, e.g., by determining transaction-level deletion dates so as to provide the transaction-level deletion functionality described above.

Transaction-level data retention policy inheritance is enabled by a combination of the system's lineage-awareness (which can apply at the dataset-and transaction-levels, as described herein), and the system's granular, transaction-level retention policies. For example, as mentioned above, the system can track lineage of not just datasets, but also individual transactions. And further, the system can provide retention policies at the transaction-level which may be inherited based on the lineage of a given transaction (e.g., that transactions relationship to other transactions or datasets). Accordingly, the system can advantageously provide transaction-level data retention policy inheritance. As an example, the system may determine a retention policy (e.g., a deletion date) for a particular transaction by determining a dataset or transaction that is upstream of that particular transaction, and by further determining a retention policy associated with that upstream dataset or transaction. The upstream retention policy may then be applied to the downstream dataset or transaction such that the downstream dataset or transaction is subject to the same deletion requirements as their parent.

In the system of the present disclosure, when a retention policy is applied to, or updated for, an upstream dataset or transaction, the system can trigger an asynchronous background process that eventually updates the retention policies and deletion dates for all descendant/downstream datasets and transactions, as described herein. These updated retention policies and deletion dates are then stored with the related datasets and transactions, as described herein. With this approach, a greater computational efficiency can be achieved because instead of building out a "deletion graph", every transaction has its own deletion date. This allows the system to know, efficiently, what transactions are going to be deleted when, which in turn allows the system to be able to rapidly determine "what is going to be deleted in the next N days". The approach of the system of the present disclosure can also provide stronger correctness guarantees, as the system can simply delete data based on the applied deletion dates, rather than building a "deletion graph" at deletion time.

Further, according to various embodiments, various interactive graphical user interfaces are provided for allowing various types of users interact with the systems and methods described herein to, for example, create or apply retention policies; interact with datasets, transactions, and their associated retention policies; and/or the like.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., management of data retention policies) is limited in various ways (e.g., not scalable, lacks lineage awareness and inheritance, lacks granularity, and/or the like), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed information via interactive graphical user interfaces. Such features and others (e.g., processing and analysis of large amounts of electronic data, management of retention policies, and/or the like) are intimately tied to, and enabled by, computer technology, and would not exist except for computer technology. For example, the interactions with, and management of, data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with and presentation of various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer-readable storage medium having program instructions embodied therewith, and one or more processors configured to execute the program instructions to cause the systems and/or computer systems to perform operations comprising one or more aspects of the above-and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 4A-4C show flowcharts illustrating example operations of an example data management system, according to one or more embodiments;

FIGS. 5A-5D show example interactive graphical user interfaces related to a data management system, according to one or more embodiments.

DETAILED DESCRIPTION

Figure 1:
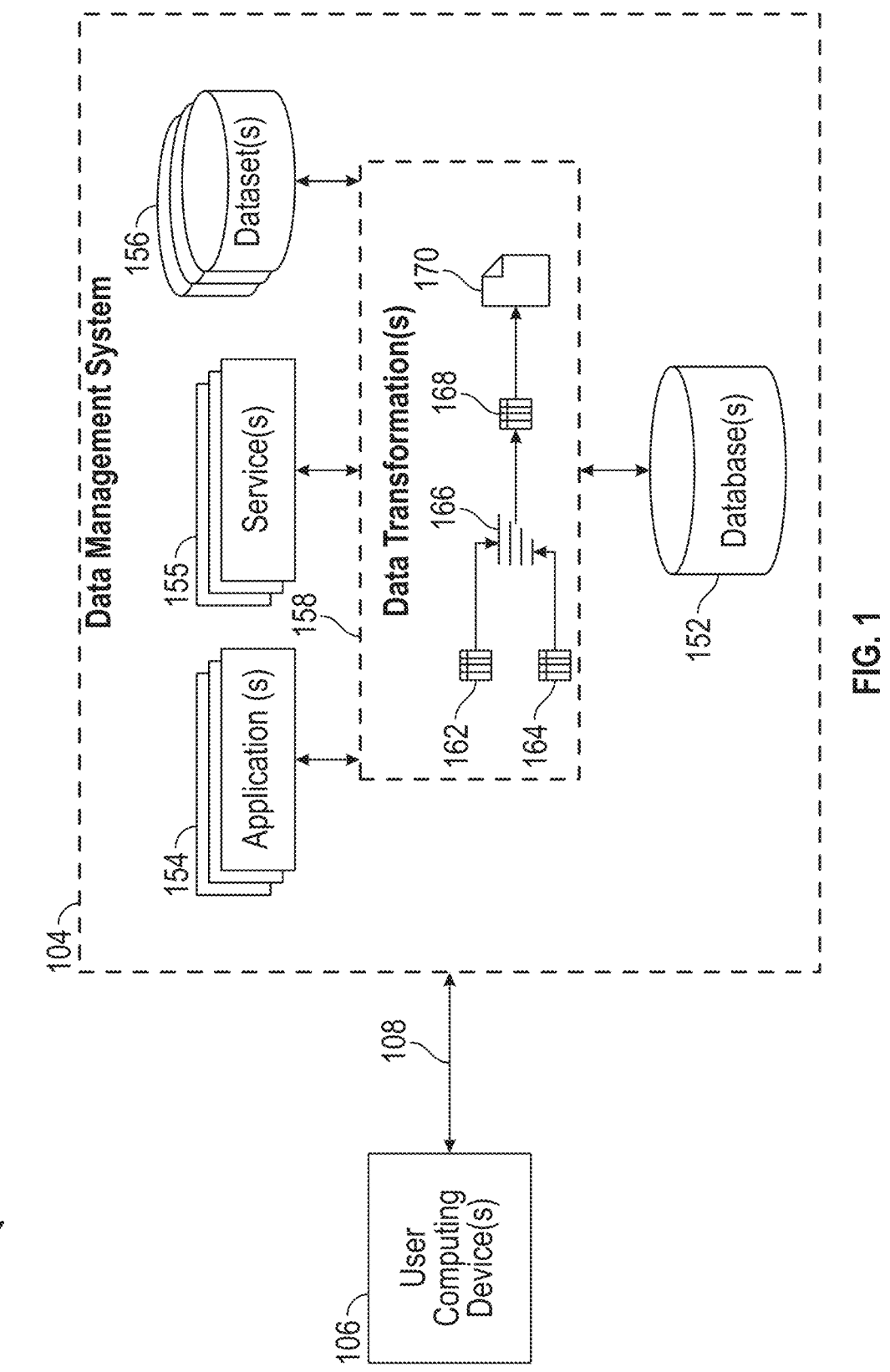
FIG. 1 shows a block diagram of an example computing environment for managing transaction-level data retention policies, according to one or more embodiments of the present disclosure.

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As noted above, while privacy legislation highlights the importance of deleting data, respecting personal data deletion policies in large-scale data systems is technically complex and cumbersome. A successful deletion solution should find every instance of sensitive data across multiple transformations and combinations of the data. However, in such systems raw data tends to quickly proliferate in original or derivative formats and copies, with each potentially involving combinations with other data. Accordingly, while the system should respect the deletion period according to the purposes of collection of the original raw data, the deletion periods and relevant related data become ever more difficult to determine and account for with each data transformation due, in part, to attenuation and/or distance from the original raw data.

The present disclosure includes a data management system (also referred to as "the system") and related processes and functionality that can provide transaction-level data retention policy inheritance. The data management system of the present disclosure can advantageously manage retention policies for datasets of the system, including at the transaction level, while further accounting for the "lineage" of each dataset and transaction. Thus, while raw data may be transformed, derived, copied, and/or the like, within the system, the system can still provide technically robust data retention policies and deletion periods, via inheritance of data retention policies, according to the purposes of collection of the original raw data.

As data moves through the system, the system can keep track of the lineage, or parent-child relationships, of the datasets, transactions, and/or data items. Accordingly, the system can advantageously be "lineage-aware". This lineage awareness can advantageously allow the system to provide technically robust data retention policies and deletion periods, via inheritance of data retention policies, based on the lineage of datasets and/or transactions. Thus, for example, when a deletion period of an upstream dataset or transaction has been satisfied, the system can robustly also delete downstream datasets or transactions according to the deletion period, if appropriate.

The system can advantageously provide management of retention policies at the dataset level, but also at more granular levels such as the transaction-level and the data item-level. Data retention policies at the transaction-level can, for example, be particularly advantageous for dynamic datasets such as described above. For example, in the instance in which data is added to a dataset at a regular cadence (e.g., additional test results are regularly added to the dataset), older data (e.g., older test results) may not need to be kept long into the future. Accordingly, it may be desirable to delete data from earlier transactions to the dataset, while keeping data from more recent transactions to the dataset. Such deletions of data from older transactions may be performed on a rolling basis, by respecting retention polices associated with each individual transaction to the dataset. The transaction-level retention policy functionality of the system of the present disclosure can advantageously enable such deletions of earlier data/transactions, while maintaining later data/transactions according to separate retention policies. In various implementations, retention policies may be set at the dataset-level and/or the transaction-level. Even when set at the dataset-level, however, the system may apply the retention policies at the transaction-level, e.g., by determining transaction-level deletion dates so as to provide the transaction-level deletion functionality described above.

Transaction-level data retention policy inheritance is enabled by a combination of the system's lineage-awareness (which can apply at the dataset- and transaction-levels, as described herein), and the system's granular, transaction-level retention policies. For example, as mentioned above, the system can track lineage of not just datasets, but also individual transactions. And further, the system can provide retention policies at the transaction-level which may be inherited based on the lineage of a given transaction (e.g., that transactions relationship to other transactions or datasets). Accordingly, the system can advantageously provide transaction-level data retention policy inheritance. As an example, the system may determine a retention policy (e.g., a deletion date) for a particular transaction by determining a dataset or transaction that is upstream of that particular transaction, and by further determining a retention policy associated with that upstream dataset or transaction. The upstream retention policy may then be applied to the downstream dataset or transaction such that the downstream dataset or transaction is subject to the same deletion requirements as their parent.

In the system of the present disclosure, when a retention policy is applied to, or updated for, an upstream dataset or transaction, the system can trigger an asynchronous background process that eventually updates the retention policies and deletion dates for all descendant/downstream datasets and transactions, as described herein. These updated retention policies and deletion dates are then stored with the related datasets and transactions, as described herein. With this approach, a greater computational efficiency can be achieved because instead of building out a "deletion graph", every transaction has its own deletion date. This allows the system to know, efficiently, what transactions are going to be deleted when, which in turn allows the system to be able to rapidly determine "what is going to be deleted in the next N days". The approach of the system of the present disclosure can also provide stronger correctness guarantees, as the system can simply delete data based on the applied deletion dates, rather than building a "deletion graph" at deletion time.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

A dataset can be any data, data asset, data item, or group of data, data assets, or data items. May include data and items that can be stored by and/or accessed by a computer system. Non-limiting examples include files, folders, computing machines, memory, processors, servers, hard drives, data tables, databases, laptops, RSA tokens, and/or the like. Also referred to herein as "resources", "computer resources", and/or the like.

A Data Object or Object can be a data container for information representing specific things that have a number of definable properties. For example, a data object can represent an entity such as a person or user, a place, a group, an organization, a resource, a data asset, a request, a purpose, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

An Object Type is a type of a data object (e.g., user, data asset, data access request, and the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

II. Example Data Management System and Related Computing Environment

FIG. 1 shows a block diagram of an example computing environment 102 for managing transaction-level data retention policies, according to one or more embodiments. The example computing environment 102 includes a data management system 104, and one or more user computing devices 106.

The user computing devices 106 may include, for example, desktops, laptops, terminals, smartphones, smart-TVs, and/or the like. The user computing devices 106 may execute various types of software applications, such as data management applications, data analysis applications, and/or the like. The user computing devices 106 can communicate with data management system 104 directly or indirectly via any appropriate communications links 108 (e.g., one or more communications links, one or more computer networks, one or more wired or wireless connections, the Internet, any combination of the foregoing, and/or the like). Similarly, the data management system 104 includes various components and aspects which may with each other directly or indirectly via any appropriate communications links (e.g., one or more communications links, one or more computer networks, one or more wired or wireless connections, the Internet, any combination of the foregoing, and/or the like).

The data management system 104 can include one or more applications 154, one or more services 155, one or more datasets 156, and a data transformation process 158 (also referred to herein as a build process). The data management system 104 can also include a data pipeline system. The data management system 104 can transform data and record the data transformations. The one or more applications 154 can include applications that enable users (e.g., users of the user computing devices 106) to view datasets, interact with datasets, filter datasets, and/or configure dataset transformation processes or builds. The one or more services 155 can include services that can trigger the data transformation builds and application programming interface ("API") services for receiving and transmitting data. The one or more datasets 156 can be automatically retrieved from external sources and/or can be manually imported by a user. The one or more datasets 156 can be in many different formats such as a tabular data format (SQL, delimited, or a spreadsheet data format), a data log format (such as network logs), or time series data (such as sensor data).

The data management system 104, via the one or more services 155, can apply the data transformation process 158. An example data transformation process 158 is shown. The data management system 104 can receive one or more datasets 162, 164. The data management system 104 can apply a transformation to the dataset(s). For example, the data management system 104 can apply a first transformation 166 to initial datasets 162, 164, which can include joining the datasets 162, 164 (such as or similar to a SQL JOIN), and/or a filtering of the datasets 162, 164. The output of the first transformation 166 can include a modified dataset 168. Dataset 168 may be stored in the datasets 156 and/or database(s) 152. A second transformation of the modified dataset 168 can result in an output dataset 170, such as a report or a joined table in a tabular data format. The output dataset 170 may be stored in datasets 156 and/or in the database 152. Each of the steps in the example data transformation process 158 can be recorded by the data management system 104 and made available as a resource or data asset. For example, a data asset can include a dataset and/or a dataset item, a transformation, or any other step in a data transformation process. As mentioned above, the data transformation process or build 158 can be triggered by the data management system 104, where example triggers can include nightly build processes, detected events, or manual triggers by a user. Additional aspects of data transformations and the data management system 104 are described in further detail below.

The techniques for recording and transforming data in the data management system 104 may include maintaining an immutable history of data recording and transformation actions such as uploading a new dataset version to the data management system 104 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable ("ACID") transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (e.g., pre-existing versions of the dataset) are preserved when a new dataset item is added to the dataset (e.g., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (e.g., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (e.g., a new dataset item of the dataset) without deleting, removing, or modifying pre-existing dataset items (e.g., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (e.g., different dataset items) of the datasets. In association with information identifying a particular version (e.g., a particular dataset item) of a dataset, there may be information identifying one or more files that contain the data of the particular dataset version (e.g., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 104 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance or lineage tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance or lineage tracking extends beyond transaction-level granularity to column-level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and "Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance or lineage tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up to date. Finally, the target output dataset is built once all of the dependent datasets are up to date.

The data management system 104 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 104 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 104 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up to date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, and/or the like.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute transformation A. The underlying data transformation engine interprets the schema information and applies it to the data in the file or files when executing transformation A.

The various data assets (e.g., files, data items, data tables, datasets, portions of datasets, transformations, and/or the like) of the data management system 104 may also be stored in the databases 152.

The data management system 104 can include various permissioning functionalities. For example, the data management system 104 can implement access control lists and/or other permissioning functionality that can enable highly granular permissioning of data assets (e.g., files, data items, datasets, portions of datasets, transformations, and/or the like). The permissioning may include, for example, specific permissions for read/write/modify, and/or the like, which may be applicable to specific users, groups of users, roles, and/or the like.

In various implementations, the data management system 104 may be part of, or comprise, various distributed, parallelized, containerized, and/or clustered computation resources and/or data storage resource. The data management system 104 may comprise a "back-end" or "cloud" server or other computing system. In some embodiments, data of the system may be conceptually structured according to databases, tables, an object-centric data model represented by ontology, and/or the like (as further described below). The data management system 104 may include various aspects, such as one or more processors, memory, data storage, computer-readable instructions, and/or the like, as described in reference to FIG. 6. Such aspects may be configured to provide the data retention policy and other functionality described herein.

In various embodiments, the various components and aspects of the data management system 104 may be implemented in various ways. For example, the data management system 104 may be implemented as a single computing system, and/or various functions or services of the data management system 104 may be split up and/or arranged differently from that shown in the example computing environment 102 of FIG. 1. Thus, for example, while in FIG. 1 dataset(s) 156 and database(s) 152 are shown as being implemented as separate components, in other implementations the datasets/databases may be combined, separated into additional datasets/databases, and/or the like. As another example, the various services of the data management system 104 may be combined and/or separated in additional services, and/or may be implemented in different ones of the various aspects of the present disclosure. For example, various of the applications 154, services 155, datasets 156, databases 152, and/or the like, may be implemented as separate computing systems or devices. However, for the purpose of providing a concise description in the present disclosure, the various functionalities are described in reference to the example implementation shown in the computing environment 102 of FIG. 1.

As used herein, the term "system" generally refers to the data management system 104, but may also include various other aspects and/or other computer systems of the present disclosure.

III. Example Object Centric Data Model

Figure 2A:
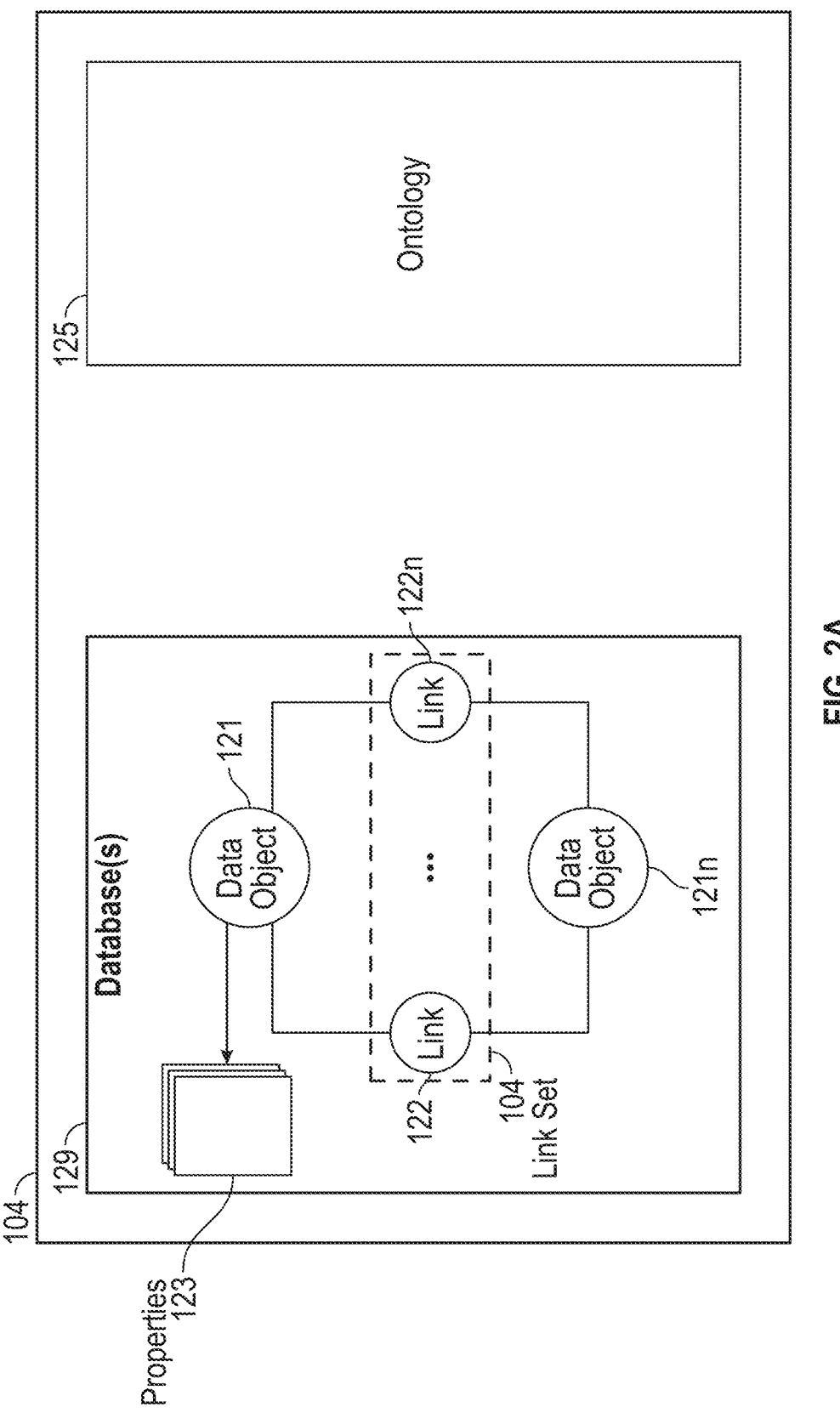
FIG. 2A shows a block diagram illustrating additional aspects of a data management system, including an example object-centric conceptual data model, according to one or more embodiments.

FIG. 2A shows a block diagram illustrating additional optional aspects of data management system 104, including an example object-centric conceptual data model, according to one or more embodiments of the present disclosure. This description is provided for the purpose of providing an example and is not intended to limit the techniques to the example data model, the example data management system 104, or the example data management system's use of an ontology to represent information.

In some embodiments, a body of data (e.g., a dataset) is conceptually structured according to an object-centric data model represented by an ontology 125. The conceptual data model is independent of any particular database used for durably storing one or more database(s) 129 based on the ontology 125. For example, each object of the conceptual data model may correspond to one or more rows in a relational database or an entry in Lightweight Directory Access Protocol (LDAP) database, or any combination of one or more databases. In an implementation, the one or more database(s) 129 may be overlap with or be comprised in, or be separate from, the database 152 of the data management system 104 as described above.

The ontology 125, as noted above, may include stored information providing a data model for storage of data in the database 129. The ontology 125 may be defined by one or more object types, which may each be associated with one or more property types. At the highest level of description, data object 121 is a container for information representing things in the world. For example, data object 121 can represent an entity such as a person or user, a place, a group, an organization, a resource, a data asset, a request, a purpose, a link, or other noun. Data object 121 can represent an event that happens at a point in time or for a duration. Data object 121 can represent a document or other unstructured data source such as an e-mail message, a news report, or a written paper or article. Each data object 121 is associated with a unique identifier that uniquely identifies the data object within the data management system.

Different types of data objects may have different property types. For example, a "Person" data object might have an "Eye Color" property type and an "Event" data object might have a "Date" property type. Each property 123 as represented by data in the data management system 104 may have a property type defined by the ontology 125 used by the database 125.

Objects may be instantiated in the database 129 in accordance with the corresponding object definition for the particular object in the ontology 125. For example, a specific folder (e.g., an object of type "Data Asset") at "C: \Folder" (e.g., a property of type "directory") may be stored in the database 129 as a data asset object metadata as defined within the ontology 125.

The data objects defined in the ontology 125 may support property multiplicity. In particular, a data object 121 may be allowed to have more than one property 123 of the same property type. For example, a "Person" data object might have multiple "Address" properties or multiple "Name" properties.

Each link 122 represents a connection between two data objects 121. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 121 can have multiple links with another data object 121 to form a link set. Each link 122 as represented by data in a database may have a link type defined by the database ontology used by the database.

Figure 2B:
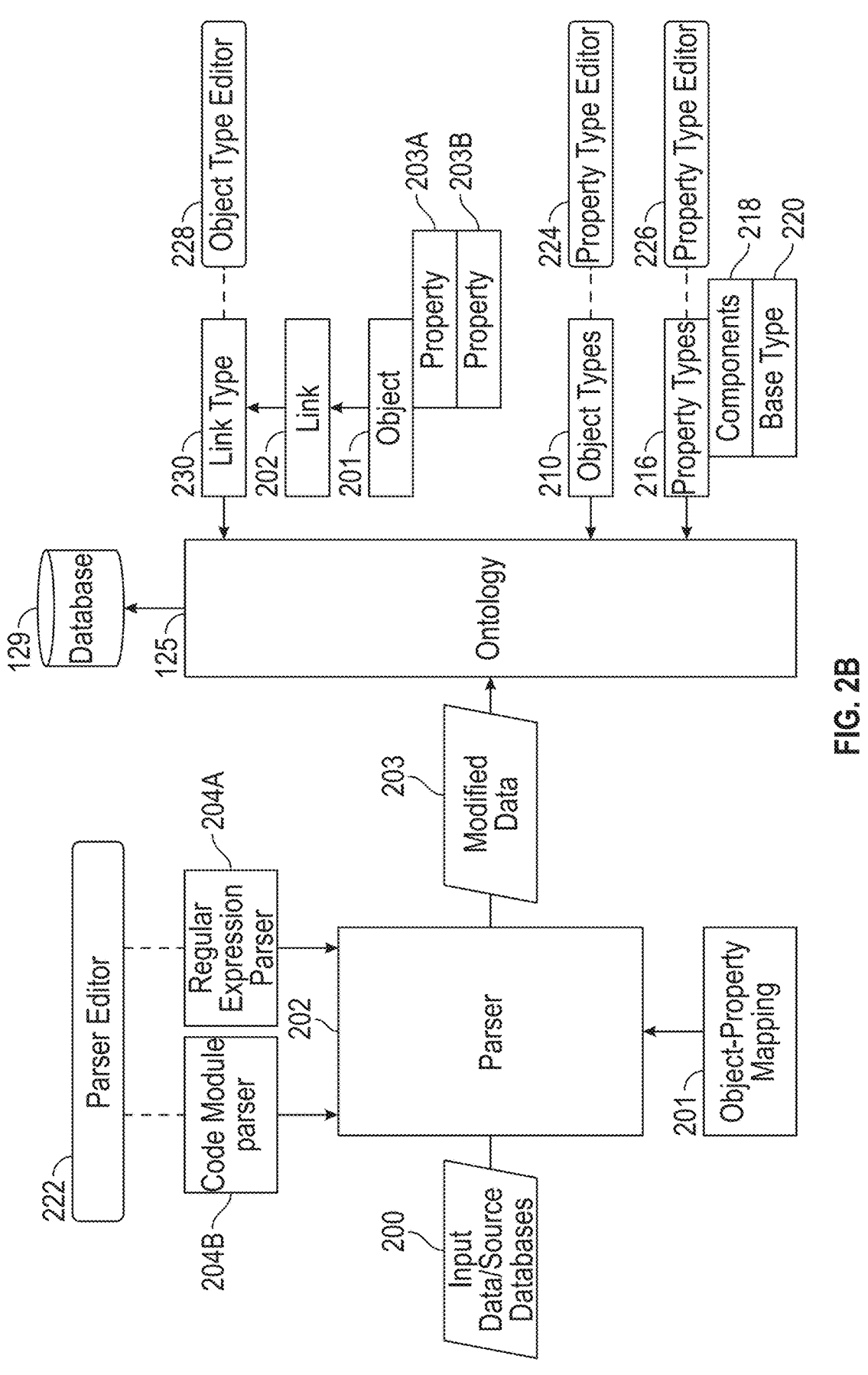
FIG. 2B shows a block diagram illustrating example components and data that may be used in identifying and storing data according to an ontology, according to one or more embodiments.

FIG. 2B shows a block diagram illustrating example components and data that may be used in identifying and storing data according to an ontology, according to one or more embodiments. In this example, the ontology may be configured, and data in the data model populated, by a system of parsers and ontology configuration tools. In the embodiment of FIG. 2B, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entry, an address for a person, and a date for when a rental car is rented. The parser 202 is able to read a variety of source input data types and determine which type of data it is reading.

In accordance with the discussion above, the example ontology 125 comprises stored information providing the data model of data stored in database 129, and the ontology is defined by one or more object types 210, one or more property types 216, and one or more link types 230. Based on information determined by the parser 202 or other mapping of source input information to object type, one or more data objects 121 may be instantiated in the database 129 based on respective determined object types 210, and each of the objects 121 has one or more properties 123 that are instantiated based on property types 216. Two data objects 121 may be connected by one or more links 122 that may be instantiated based on link types 230. The property types 216 each may comprise one or more data types 218, such as a string, number, and/or the like. Property types 216 may be instantiated based on a base property type 220. For example, a base property type 220 may be "Locations" and a property type 216 may be "Home."

In some embodiments, an administrator of the system (e.g., a user with the proper role and/or permissions) uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201 (including properties 208A, 208B), the parser 202 selects one of the parser definitions that is associated with a property type in the input data. The parser parses an input data field using the selected parser definition, resulting in creating new or modified data 203. The new or modified data 203 is added to the database 129 according to ontology 125 by storing values of the new or modified data in a property of the specified property type. As a result, input data 200 having varying format or syntax can be created in database 129. The ontology 125 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

IV. Example Transaction-Level Data Retention Policy Functionality

As noted above, the data management system 104 and related processes and functionality that can provide transaction-level data retention policy inheritance. The data management system can advantageously manage retention policies for datasets of the system, including at the transaction level, while further accounting for the "lineage" of each dataset and transaction. Thus, while raw data may be transformed, derived, copied, and/or the like, within the system, the system can still provide technically robust data retention policies and deletion periods, via inheritance of data retention policies, according to the purposes of collection of the original raw data.

As mentioned above, the system may maintain a "lineage" of data within the system. The "lineage" of a piece of data describes what other data was used to create that data. As data flows through the system, parent-child relationships can be produced between datasets and/or transactions to datasets. The lineage of a data item, transaction, or dataset may also be referred to in terms of "provenance", "derivation", "parent" and "child" relationships, "upstream" and "downstream" relationships, and/or the like. For example, a first dataset may be derived from a second dataset. In this scenario, the second dataset may be considered a parent of, or upstream from, the first dataset, and the first dataset may be considered a child of, or downstream from, the second dataset. The lineage of each dataset comprises information regarding the relationships among the various datasets. Lineage may include multiple levels and may include combinations of datasets. Lineage may also include various additional information, such as transformations of data, data filtering, data queries, and/or the like. Lineage may also be stored for individual transactions, individual data items, and/or the like.

Figure 3A:
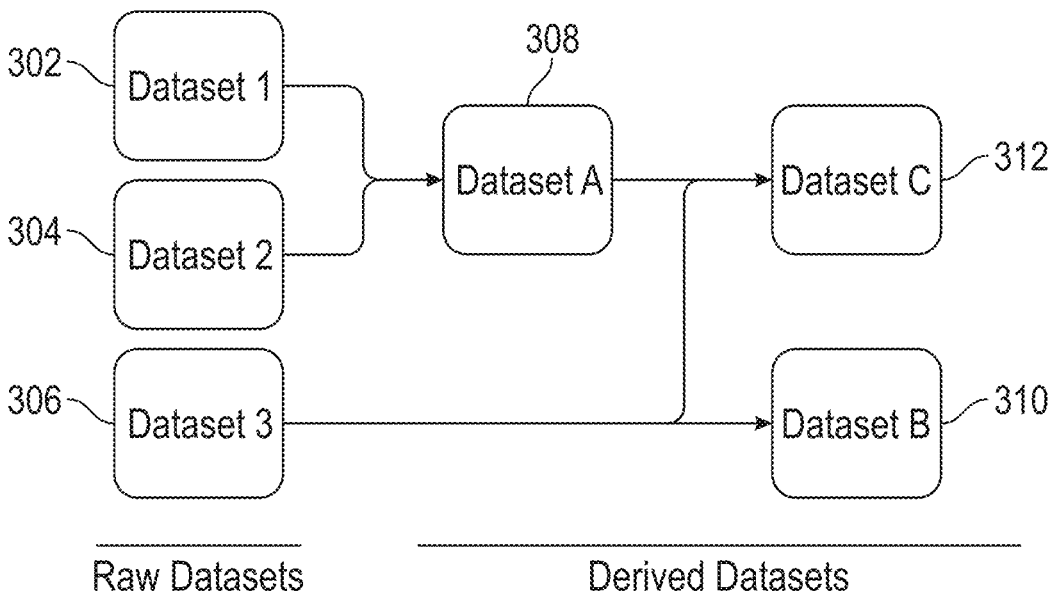
FIGS. 3A-3D show diagrams illustrating example datasets, transactions, transaction-level data retention policies, and the like, according to one or more embodiments.

FIG. 3A shows a diagram of some example datasets that may be stored by the system, and their relationships with one another that may be stored by the system. The relationships among the datasets may result from, for example, one or more transformations (and/or the like) as described above in reference to FIG. 1. In the example, dataset 1 (302), dataset 2 (304), and dataset 3 (306) each comprise "raw" datasets, while dataset A (308), dataset B (310), and dataset C (312) each comprise "derived" datasets. A "raw" dataset can be a dataset that has no parent dataset within the system, while a "derived" dataset can be a dataset that has at least one parent dataset within the system. In the illustrated example, dataset A (308) is derived from both dataset 1 (302) and dataset 2 (304). Accordingly, dataset A (308) is a child of, and downstream from, dataset 1 (302) and dataset 2 (304); while dataset 1 (302) and dataset 2 (304) are parents of, and upstream from, dataset A (308). Similarly, dataset C (312) is derived from dataset 3 (306) and dataset A (308), and thereby also from dataset 1 (302) and dataset 2 (304). Accordingly, dataset C (312) is a child of, and downstream from, dataset 1 (302), dataset 2 (304), dataset 3 (306), and dataset A (308); while dataset 1 (302), dataset 2 (304), dataset 3 (306), and dataset A (308) are all parents of, and upstream from, dataset C (312). FIG. 3A illustrates a simplified example of the complexity of data relationships that can exist in the system of the present disclosure. As noted above, such relationships can also exist, and be tracked, at the transaction and/or data item levels.

As data moves through the system, the system can keep track of the lineage, or parent-child relationships, of the datasets, transactions, and/or data items. Accordingly, the system can advantageously be "lineage-aware". This lineage awareness can advantageously allow the system to provide technically robust data retention policies and deletion periods, via inheritance of data retention policies, based on the lineage of datasets and/or transactions. Thus, for example, when a deletion period of an upstream dataset or transaction has been satisfied, the system can robustly also delete downstream datasets or transactions according to the deletion period, if appropriate (and as further discussed herein).

As noted above, datasets may not be static, but rather may be dynamic in the sense that additional data is being added to the dataset frequently, regularly, periodically, intermittently, on demand, continuously, substantially continuously, or any combination of the foregoing and/or the like. Such instances of additions of data can comprise "transactions" to a dataset. A transaction can comprise any data, e.g., one or more data items, added to a dataset, edited in a dataset, removed from a dataset, or any combination of adding, editing, or removing. For the purpose of providing a concise disclosure, in the present description transactions are generally described as data that is added to a dataset. However, as noted previously, transactions can also include other modifications and/or deletions of data from a dataset.

The system can advantageously provide management of retention policies at the dataset level, but also at more granular levels such as the transaction-level and the data item-level. Data retention policies at the transaction-level can, for example, be particularly advantageous for dynamic datasets such as described above. For example, in the instance in which data is added to a dataset at a regular cadence (e.g., additional test results are regularly added to the dataset), older data (e.g., older test results) may not need to be kept long into the future. Accordingly, it may be desirable to delete data from earlier transactions to the dataset, while keeping data from more recent transactions to the dataset. Such deletions of data from older transactions may be performed on a rolling basis, by respecting retention polices associated with each individual transaction to the dataset. The transaction-level retention policy functionality of the system of the present disclosure can advantageously enable such deletions of earlier data/transactions, while maintaining later data/transactions according to separate retention policies. In various implementations, retention policies may be set at the dataset-level and/or the transaction-level. Even when set at the dataset-level, however, the system may apply the retention policies at the transaction-level, e.g., by determining transaction-level deletion dates so as to provide the transaction-level deletion functionality described above.

Advantageously, the system may determine and store transaction-level data retention polices with the transactions in a given dataset. Such transaction-level data retention policies may comprise, for example, a calculated deletion date. Transaction-level data retention policies may further comprise, for example, a transaction creation date, which may be used when re-calculating a deletion date in response to an updated upstream retention policy. Transaction-level data retention policies may further comprise, for example, a unique identifier associated with the transaction, which may be used to query a service (e.g., one or more of services 155), a data source, and/or any combination of the foregoing, of the system to determine any upstream or downstream datasets or transactions. Transaction-level data retention policies may further comprise, for example, unique identifiers or other indications of any upstream or downstream datasets or transactions. Data retention polices may be stored, for example, as data or metadata associated with a dataset or transactions. The retention polices may be stored with the dataset or transaction (e.g., in a cell, column, or row of a data table, or as a property of a data object), or separate from the dataset or transaction (e.g., in a separate database or a separate table of a database, or as a linked data object).

The system can advantageously support and/or provide various types of data retention policies. Data retention policies may also be referred to as "retention policies" or "deletion policies". Examples of retention/deletion policies include Time to Live ("TTL") policies and Fixed Deletion Date ("FDD") policies. A TTL policy may indicate, for example, that data is to be deleted some fixed amount of time (e.g., some number of minutes, hours, days, weeks, months, years, any combination of the foregoing, and/or the like) after it is created or received. As applied to a dataset, a TTL policy may thus indicate that each transaction is to be deleted some fixed amount of time after the creation or receipt date of that transaction. A FDD policy may indicate, for example, that data is to be deleted on a fixed date or fixed point in time (e.g., a particular calendar day, hour, minute, and/or the like). As applied to a dataset, a FFD policy may thus indicate that each transaction is to be deleted on a fixed day or point in time. As noted above, in general retention/ deletion policies are applied by the system at the dataset-level, and then further transaction-level retention policies (e.g., including deletion dates) may be determined by the system based on the dataset-level retention policy. However, in some instances the system may particularly apply retention policies at the transaction-level rather than the dataset level. Retention policies can be applied on any dataset, but generally are most useful on raw datasets. Advantageously, transaction-level retention policies enable preservation of certain parts of a dataset, and deletion of other parts of the dataset that may no longer be needed. As described herein, retention policies as applied to datasets and/or transactions may be set and/or customized by a user of the system, and/or may be inherited.

Figure 3B:
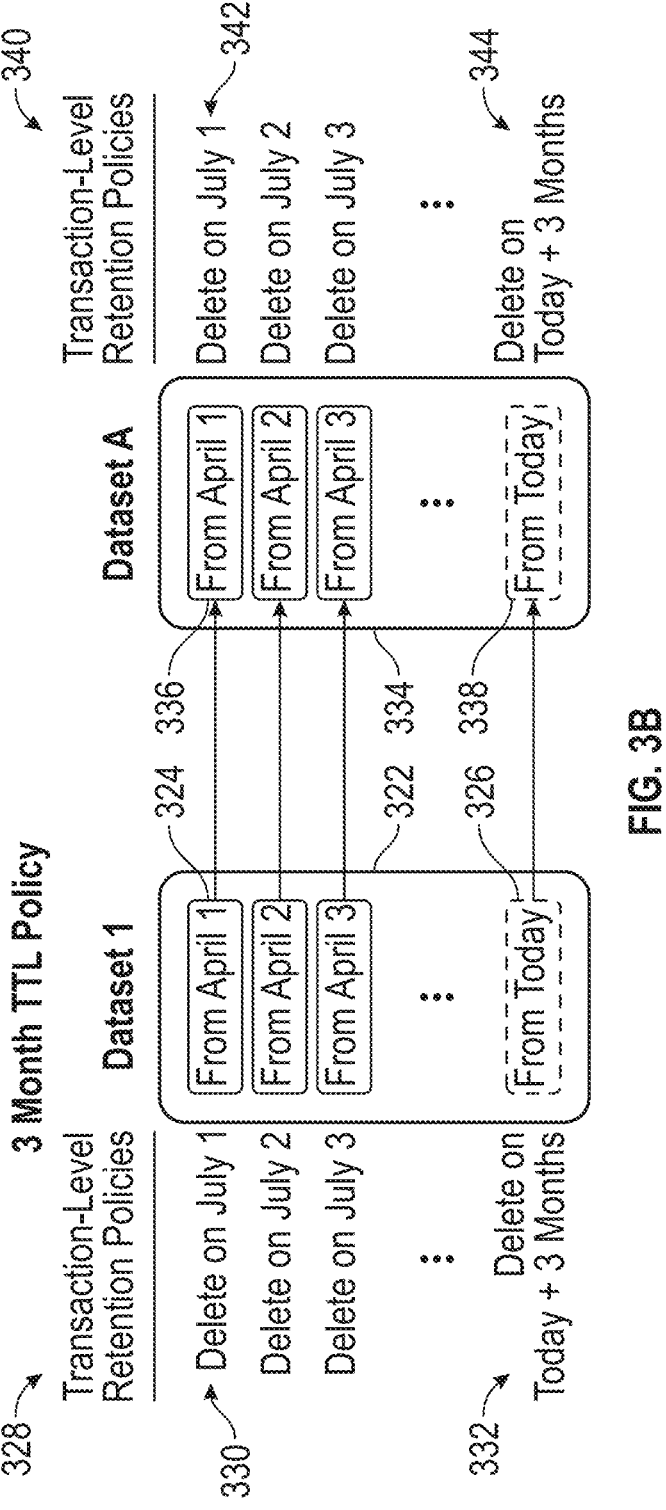

FIG. 3B shows a diagram of some example datasets that may be stored by the system, transactions associated therewith, and the relationships between the datasets by way of the related transactions, that may be stored by the system. In the example, dataset 1 (322) comprises a plurality of transactions 324-326. In the example, each of the transactions is received on a different day. Additionally, in the example, the dataset has a retention policy (e.g., a TTL policy) that indicates data should be kept for three months after it is received (e.g., the data should be deleted three months after being received). Accordingly, the system maintains transaction-level retention policies 328 for the dataset 1 (322). As illustrated, the transaction-level retentions policies include indications, for each transaction, of at least deletion dates 330-332. The deletion dates for each transaction can be different, as the system determines retention policies, and associated deletion dates, for each individual transaction.

Transaction-level data retention policy inheritance is enabled by a combination of the system's lineage-awareness (which can apply at the dataset-and transaction-levels, as described herein), and the system's granular, transaction-level retention policies. For example, as mentioned above, the system can track lineage of not just datasets, but also individual transactions. And further, the system can provide retention policies at the transaction-level which may be inherited based on the lineage of a given transaction (e.g., that transactions relationship to other transactions or data-sets). Accordingly, the system can advantageously provide transaction-level data retention policy inheritance. As an example, the system may determine a retention policy (e.g., a deletion date) for a particular transaction by determining a dataset or transaction that is upstream of that particular transaction, and by further determining a retention policy associated with that upstream dataset or transaction. The upstream retention policy may then be applied to the downstream dataset or transaction such that the downstream dataset or transaction is subject to the same deletion requirements as their parent.

Yet further, when a particular transaction is derived from multiple datasets or transactions, the system may combine the retention policies for those multiple upstream datasets or transactions to determine a retention policy for the particular transaction. Combining retention policies may comprise, for example, determining a minimum or a maximum deletion date for the particular transaction, based on the upstream retention polices. For example, if a first upstream retention policy indicates a TTL policy of 3 months, and a second upstream retention policy indicates a TTL policy of 2 months, and if the system is configured to determine a minimum deletion date for the particular transaction, the system may determine transaction-level retention policy that comprises a deletion date that is 2 months from the creation or receipt of the particular transaction. As another example, if a first upstream retention policy indicates a TTL policy of 3 months, and a second upstream retention policy indicates a FFD policy of a date that is one week away from the creation or receipt of the particular transaction, and if the system is configured to determine a minimum deletion date for the particular transaction, the system may determine transaction-level retention policy that comprises a deletion date that is one week from the creation or receipt of the particular transaction. Analogously, the system may determine maximum deletion dates, if so configured.

Referring again to FIG. 3B, dataset A (334) is derived from dataset 1 (332), or more accurately, dataset A (334) includes transactions 336-338 which are derived from dataset 1 (332). Accordingly, when determining transaction-level retention polices 340 for transactions 336-338 of dataset A (334), the system determines any transactions or datasets that are upstream of the particular transactions, and thereby identifies dataset 1 (322) and respective transactions 330-332. Then, the system can determine retention policies associated with dataset 1 (322) and/or respective transactions 330-332, when determining the transaction-level retention policies 342-344 for transactions 336-338. As an example, when transaction 336 is received to dataset A (334) on April 1, the system may determine (1) that transaction 336 is derived from transaction 324, (2) that a retention policy associated with transaction 324 indicates a TTL policy of 3 months, and (3) that the deletion date (e.g., a retention policy) of transaction 336 is July 1. The system may similarly determine inherited retention policies at multiple levels, e.g., for transactions of dataset C (312) of FIG. 3A, based on the relevant upstream retention policies of dataset A (308) and datasets 1, 2, and 3 (302, 304, and 306).

Figure 3C:
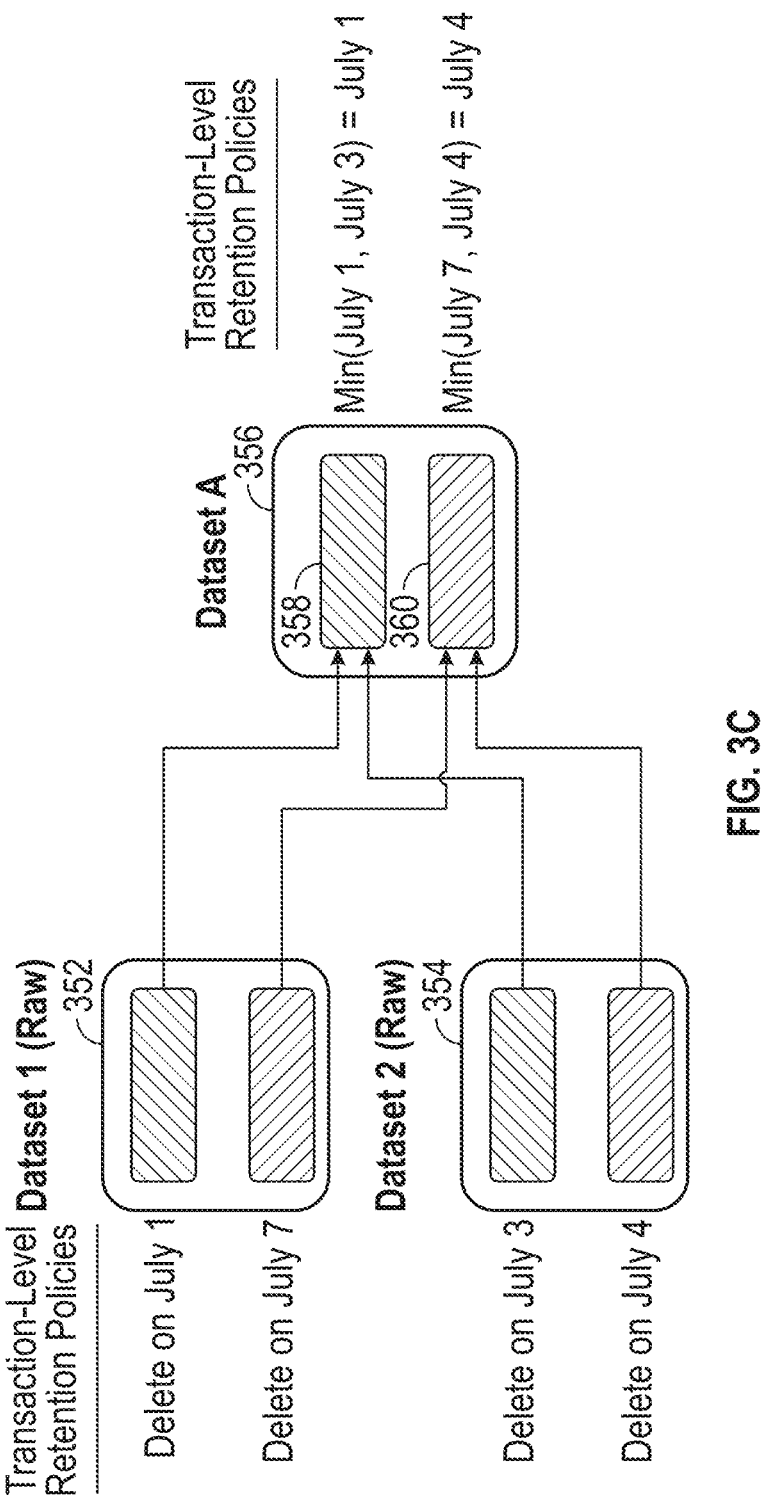

FIG. 3C shows a diagram of some additional example datasets that may be stored by the system, transactions associated therewith, and the relationships between the datasets by way of the related transactions, that may be stored by the system. In the example, dataset 1 (352) and dataset 2 (354) each comprise a plurality of transactions with associated retention policies. Dataset A (356) is derived from both dataset 1 (352) and dataset 2 (354), including transactions 358, 360, as illustrated. Because transactions 358, 360 each have two upstream related transactions or datasets, the transaction-level retention policies for transactions 358, 360 are each determined based on a combination of the applicable upstream retention policies. As illustrated, in the example of transaction 358, the parent retention policies indicate deletion dates of July 1 and July 3, respectively. The system in this example is configured to determine the minimum deletion date for derived transactions, which is July 1. Accordingly, transaction 358 is assigned a transaction-level retention policy indicating a deletion date of July 1. A similar determination is made for transaction 360.

One alternative way in which such a system may be designed is to require a deletion date only on raw datasets. Then when a deletion date of a downstream transaction is to be determined, the system can traverse up the lineage to determine the appropriate deletion date or other retention policy. Such an implementation may have the advantage that deletion dates only need to be stored for the ancestor raw transactions, and not for descendant child transaction. However, some disadvantages of such an approach include that it may not always produce a correct result, and it may not lend itself to transparency. For example, in this approach, between the time the system derived the "deletion graph" and the time the deletion was executed, a new piece of data could be created, which would not be deleted with the data represented in the deletion graph. This could be remedied by locking down all the data such that no new data could be created from it, but that may add additional complication to the system. As another example, in this approach, in order to find out what was to be deleted in the next N days, the system would have to traverse the entire data graph starting from every raw dataset that had a deletion date. Such an approach could be quite computationally expensive.

Advantageously, the transaction-level data retention policy inheritance functionality of the present disclosure, in which retention policies and deletion dates are calculated for each transaction, can provide multiple technical benefits including, for example, correctness, transparency, verifiability, and/or efficiency. The system can provide correctness at least in the sense that all data scheduled for deletion can be deleted at the appropriate time, and data not scheduled for deletion is not deleted. The system can provide transparency at least in the sense that the system clearly indicates when data is going to be deleted and why it is going to be deleted. The system can provide verifiability at least in the sense that the system can provide confirmation when data is successfully deleted, including capturing reasons for the data deletion. The system can provide efficiency at least in the sense that large-scale datasets do not need to be re-computed for small deletions, and changes to retention policies can be rapidly propagated to related datasets and transactions.

In the system of the present disclosure, when a retention policy is applied to, or updated for, an upstream dataset or transaction, the system can trigger an asynchronous background process (e.g., as provided by one or more services 155) that eventually updates the retention policies and deletion dates for all descendant/downstream datasets and transactions, as described herein. These updated retention policies and deletion dates are then stored with the related datasets and transactions, as described herein. With this approach, a greater computational efficiency can be achieved because instead of building out a "deletion graph" as in alternative approach mentioned above, every transaction has its own deletion date. This allows the system to know, efficiently, what transactions are going to be deleted when, which in turn allows the system to be able to rapidly determine "what is going to be deleted in the next N days". The approach of the system of the present disclosure can also provide stronger correctness guarantees, as the system can simply delete data based on the applied deletion dates, rather than building a "deletion graph" at deletion time.

In an implementation, when a retention policy is applied to, or updated for, an upstream dataset or transaction, the system may proceed as follows. First, the system may apply the retention policy to the transactions of the present dataset. Second, the system may determine any datasets downstream of the present dataset. Third, the system may update the retention policies of the transactions of the downstream datasets. This step may include, for example, for each of the transactions, determining any upstream datasets or transactions, determining any retention policies of those upstream datasets or transactions, and them based on those upstream retention policies, determining an updated retention policy and deletion date for the transaction. This approach to updating retention policies may be more efficient than alternative approaches because, for example, in the second step the system may efficiently focus on downstream datasets rather than downstream transactions. This may be more efficient because the retention policies of the downstream datasets may need to be updated in their entireties anyway, and looking up (e.g., via a service 155 and using related unique identifiers) downstream datasets involves fewer lookups than looking up all downstream transactions (multiple of which may exist in the same downstream datasets).

In various implementations, the system can also provide functionality for certain users (e.g., "admin"-type users) to set "override" policies on datasets and/or transactions. An "override" policy is a retention policy that essentially "severs" the influence of all ancestor retention policies on the transactions of that dataset. Accordingly, the transaction or dataset on which the override policy is applied is essentially removed from the lineage of any upstream transactions or datasets, such that changes to retention policies on those upstream transactions or datasets are no longer propagated to the overridden transactions or datasets. In this implementation, and like with any retention policy of the system, once an override policy is applied on a dataset or transaction, all descendants of that dataset or transaction are also impacted by it. An override dataset or transaction can also be specified with an optional superseding policy, e.g., a new policy to subject the downstream dataset or transaction to. Similarly, in various instances datasets and/or transactions of the system may be severed from the lineage such that any upstream retention policy changes will no longer impact the given datasets and/or transactions.

Figure 3D:
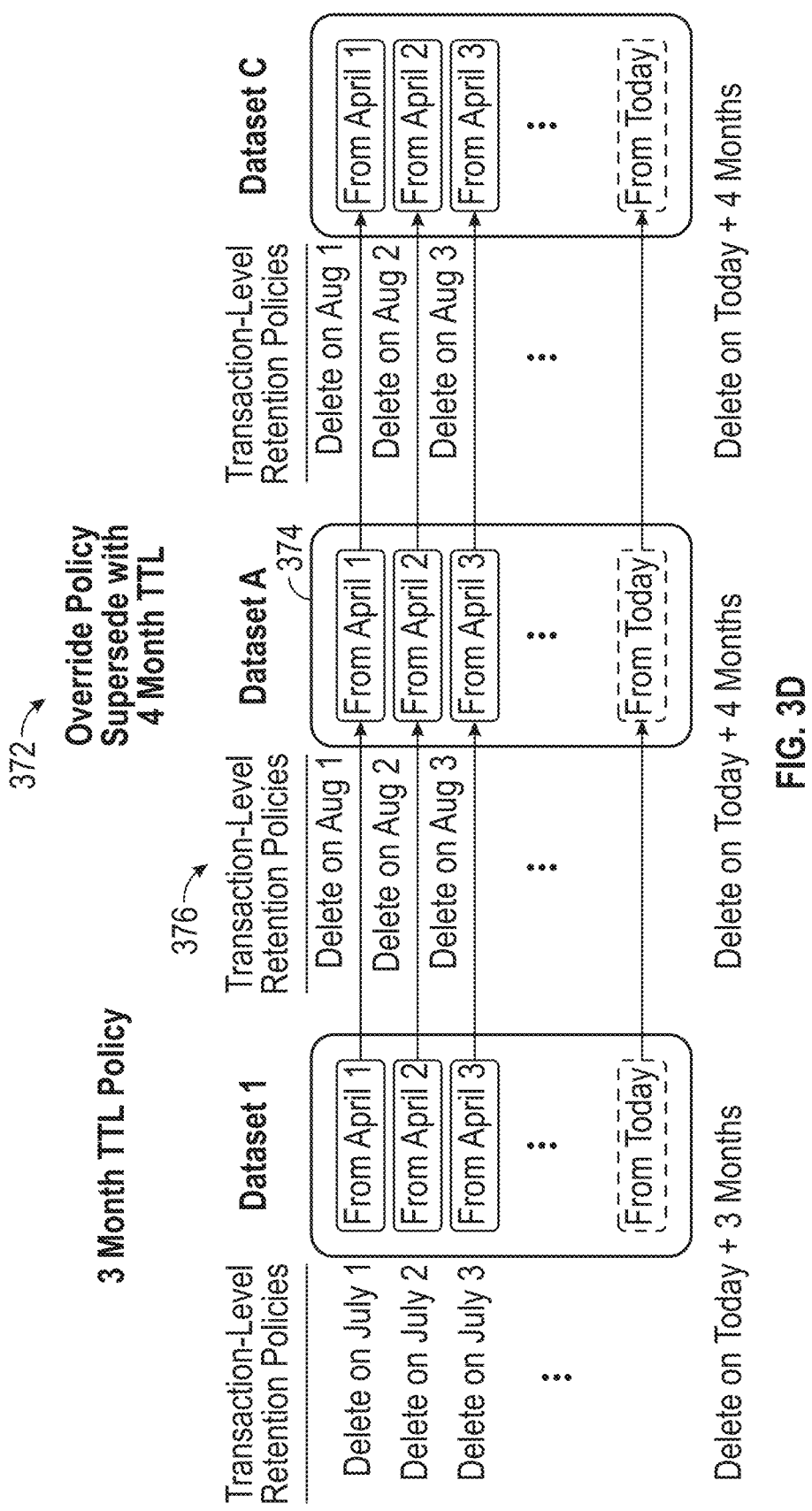

FIG. 3D shows a diagram of some example datasets that may be stored by the system, transactions associated therewith, and the relationships between the datasets by way of the related transactions, that may be stored by the system. The illustrated example is similar to that described above in reference to FIG. 3B, as it includes two datasets (dataset 1 and dataset A) that are related, and each include a plurality of transactions. However, in addition the example includes a dataset C which is derived from dataset A (374), and also includes a plurality of transactions that inherit retention policies from dataset A (and also dataset 1). As illustrated, the user has applied an override policy 372 to dataset A, setting a TTL policy of 4 months (rather that the TTL policy of 3 months of dataset 1). Accordingly, the inheritance of the retention policy of dataset 1 is severed, and updated transaction-level retention policies 376 are determined for the transactions of dataset A (374). Then, because dataset C is derived from dataset A, the transaction-level retention policy of dataset C are determined based on the override policy 372.

In various implementations, the system may determine a compatibility between retention policies of datasets or transactions. Such compatibility determinations may be performed, for example, when a relationship between the datasets or transactions is severed, or if such a relationship is not going to be maintained. For example, if a dataset or transaction is going to be shared or copied to a second system or application, but a lineage relationship is not going to be maintained, the system may first, before allowing the sharing or copying, determine that the retention policy of second system or application is compatible with the existing retention policy of the dataset or transaction. Such compatibility may include, for example, ensuring the deletion date of the present retention policy will not be extended by the retention policy of the second system or application (e.g., the retention policy to be applied by the second system or application must result in a deletion date that is less than or equal to the present deletion date). Such compatibility may be determined, for example, between retention policies of different types by determining resulting deletion dates for the different types of retention policies. If the system determines that the two retention policies are compatible, then the system may allow the sharing or copying of the dataset or transaction, including the severing of the shared or copied dataset or transaction from the source dataset or transaction.

In accordance with the description above, when a deletion date is met, the system deletes the data items associated with the applicable transaction and/or dataset.

V. Example Operations of the System

FIGS. 4A-4C show flowcharts illustrating example operations the data management system 104, according to one or more embodiments. The blocks of the flowcharts illustrate example implementations, and in various other implementations various blocks may be rearranged, optional, and/or omitted, and/or additional block may be added. In various embodiments, the example operations of the system illustrated in FIGS. 4A-4C may be implemented, for example, by the one or more aspects of the data management system 104, other aspects of the computing environment 102, and/or the like.

Referring to FIG. 4A, at block 402, the system stores, receives, or accesses a dataset. As described above, the dataset may be a raw dataset or a derived dataset. At block 404, the system receives a transaction to the dataset comprising one or more data items. at block 406, the system determines a relationship of the transaction and/or the dataset with any other transactions or datasets. For example, as described about the system may query or reference one or more services and/or data sources using a unique identifier associated with the transaction or dataset, which services and/or data sources may respond with information indicative of, for example, any upstream and/or downstream transactions or datasets. At block 408, the system determines a retention policy for the received transaction or dataset, based on, for example, any retention policies associated with any upstream transactions or datasets. at block 410, the system calculates a deletion date for the transaction or dataset based on the determined, e.g., upstream retention policy(ies). As described above, the deletion date may comprise a minimum deletion date, a maximum deletion date, and average deletion date, and/or another calculated deletion date. At block 412, the system stores a retention policy for the transaction or dataset, e.g., including the calculated deletion date, a transaction or dataset creation date, any applicable unique identifiers, and/or the like, with the transaction or dataset. At block 414, the system may optional provide an interactive graphical user interface including indications of one or more retention policies and/or deletions dates. Examples of such interactive graphical user interfaces are described below. At block 416, the system may delete a transaction and/or dataset based on the associated retention policy and/or deletion date.

Referring to FIG. 4B, at block 422, the system receives a specification of a retention policy and/or an update to a retention policy of a transaction or dataset. At block 424, in response to receiving the retention policy, the system determines (e.g., by querying one or more services and/or data sources, as described herein) any downstream transactions and/or datasets of the transaction or dataset for which the retention policy was received. At block 426, the system determines retention policies for the determined downstream transactions and/or datasets. In an implementation, this block may include, as described above, determining any upstream transactions and/or datasets of each particular transaction of a determined dataset, and determining retention policies associated with those upstream transactions and/or datasets. At block 428, the system calculates a deletion date based on the determined retention policies. As described above, the deletion date may comprise a minimum deletion date, a maximum deletion date, and average deletion date, and/or another calculated deletion date. At block 430, the system stores the deletion date, and other related retention policy details (e.g., a transaction creation date, applicable unique identifiers, and/or the like) with the transaction and/or dataset. As described above, the process of determining retention policies for downstream datasets and transactions may be performed asynchronously by a background process of the system.

In an implementation, when a retention policy is applied to, or updated for, an upstream dataset or transaction, the system may proceed as follows. First, the system may apply the retention policy to the transactions of the present dataset. Second, the system may determine any datasets downstream of the present dataset. Third, the system may update the retention policies of the transactions of the downstream datasets. This step may include, for example, for each of the transactions, determining any upstream datasets or transactions, determining any retention policies of those upstream datasets or transactions, and them based on those upstream retention policies, determining an updated retention policy and deletion date for the transaction. This approach to updating retention policies may be more efficient than alternative approaches because, for example, in the second step the system may efficiently focus on downstream datasets rather than downstream transactions. This may be more efficient because the retention policies of the downstream datasets may need to be updated in their entireties anyway, and looking up (e.g., via a service 155 and using related unique identifiers) downstream datasets involves fewer lookups than looking up all downstream transactions (multiple of which may exist in the same downstream datasets).

Referring to FIG. 4C, at block 442, the system receives a user input to sever a dependency or relationship of a dataset or transaction with another dataset or transaction. The user input may comprise an input to share a dataset or transaction with another system or application with which a lineage will not be maintained, as described above. Alternatively, at block 444 the system receives an override policy for a dataset or transaction. At block 446, the system optionally determined a compatibility of a current retention policy with a retention policy that will be applied, e.g., by another system or application. At block 448, the system optionally establishes a retention policy for the dataset and/or transaction that is severed and/or based on the override policy. At block 450, the system severs the relationship of the dataset or transaction with another dataset or transaction.

VI. Example Interactive Graphical User Interfaces

FIGS. 5A-5D illustrate example interactive graphical user interfaces of the system, according to various embodiments. The example user interfaces are provided for illustrative purposes to show various functionalities of the system. In other implementations, the interactive graphical user interfaces may include more or fewer elements, may be arranged differently, and/or may be combined or divided. The various example interactive graphical user interfaces may be generated/provided by the data management system 104, the applications 154, other aspects of the data management system 104, other aspects of the computing environment 102, and/or the like. For example, the data management system 104 and/or an application 154 may provide information useable for and/or may cause an interactive graphical user interface to be generated and/or displayed to the user on a user computing device 106. As described below, information provided in the interactive graphical user interfaces may be based on, for example, information provided by the data management system 104.

Figure 5A:
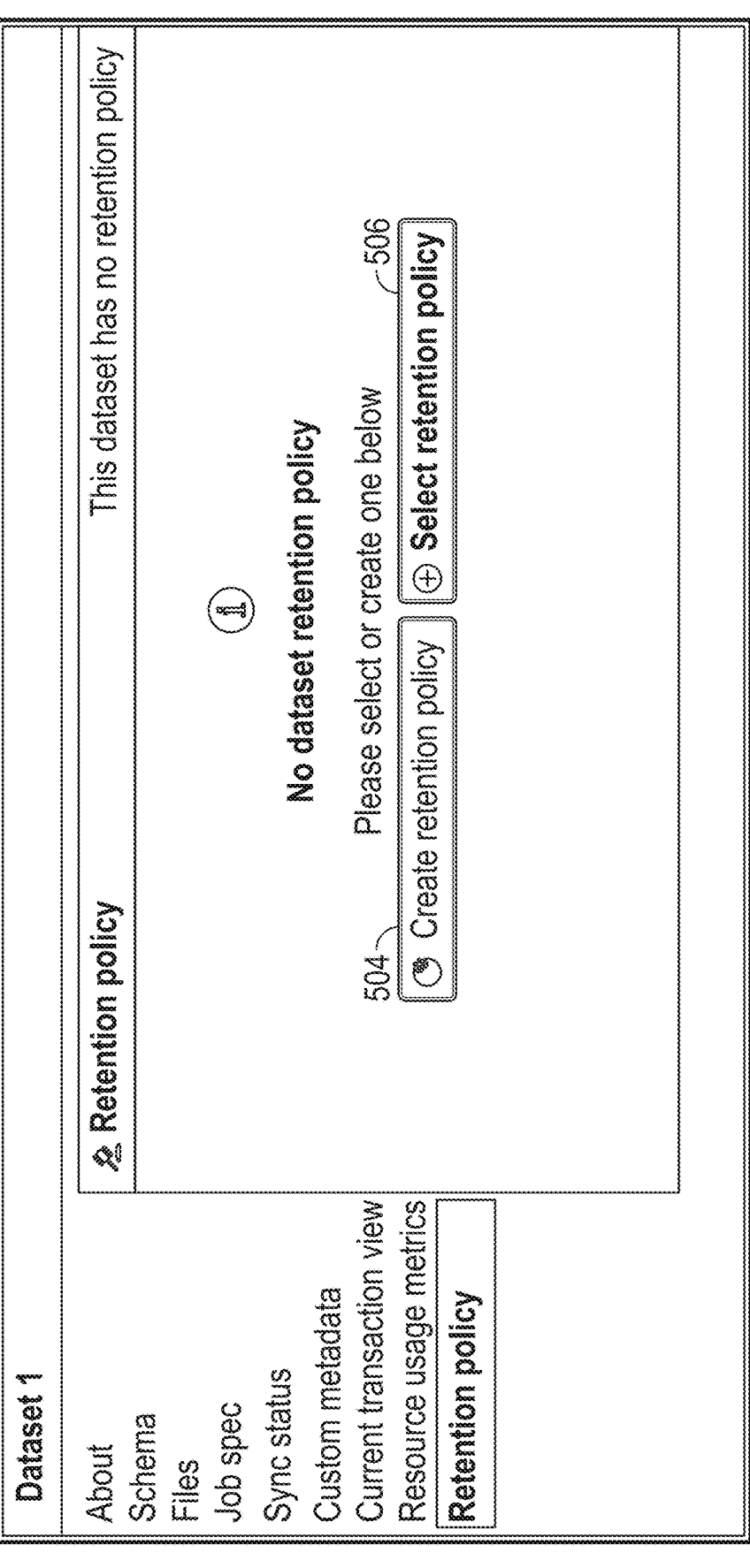

FIG. 5A illustrates a graphical user interface 502 by which a user may specify a retention policy for a dataset or transaction. As shown, the graphical user interface may indicate that no retention policy is currently associated with dataset 1. Accordingly, the user may use user interface elements 504 or 506 to create a retention policy, or select an existing retention policy to apply to the dataset.

FIG. 5B illustrates a graphical user interface 512 by which a user may create a retention policy, e.g., for applying to a dataset. Via the fields and user interface elements of the graphical user interface, the user may provide a name, description, a retention policy type, and associated criteria. For example, for a TTL policy, the user may specify a time to live period of time. For a FFD policy, the user may specify a date for deletion.

FIG. 5C illustrates a graphical user interface 522 by which a user may view listings of retention policies and the datasets and/or transactions they are applied to in the system. For example, the user may select an existing retention policy from a listing 524. In response, the system may show a list 526 of datasets and/or transactions to which the selected retention policy is applied. The graphical user interface may additionally show details regarding the retention policy.

FIG. 5D illustrates a graphical user interface 532 by which a user may view any datasets and/or transactions that are due for deletion in accordance with the calculated deletion dates and/or retention policies. As shown, the graphical user interface may include a table 534 listing the datasets, related deletion dates, number of transaction to be deleted in each dataset, current retention policy, and whether the applicable retention policy is inherited and/or overridden. The graphical user interface may list, for example, any datasets and/or transactions to be deleted in the next number of hours, number of days, number of weeks, number of months, and/or the like. The graphical user interface may also show details related to each dataset/transaction, including, for example, a current retention policy, and whether the retention policy is inherited or overridden. Using user interface element 536, the user may cause the system to load an addition set of items to the list that are to be deleted in a next period of time. As described above, the system may advantageously efficiently determine such information because the deletion dates associated with all datasets and transactions are calculated and stored with those datasets and transactions.

VII. Additional Implementation Details and Embodiments

In an implementation the system (e.g., one or more aspects of the data management system 104, other aspects of the computing environment 102, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 6) to implement one or more aspects of the modules and/or functionality described herein. Further, in this implementation, one or more services/modules/engines/and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
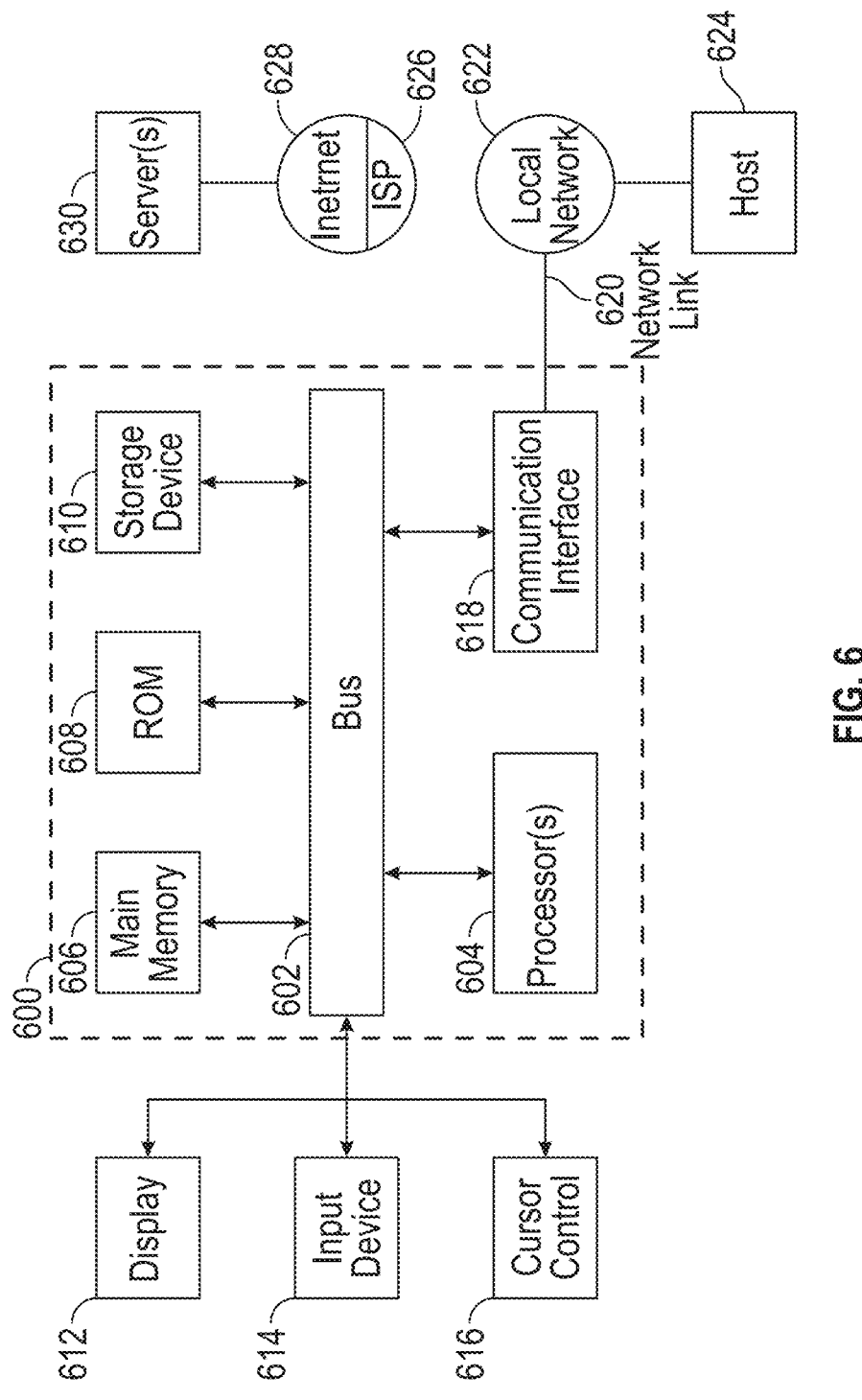
FIG. 6 shows a block diagram illustrating a computer system upon which various embodiments may be implemented.

For example, FIG. 6 shows a block diagram that illustrates a computer system 600 upon which various implementations and/or aspects (e.g., one or more aspects of the data management system 104, the user computing devices 106, other aspects of the computing environment 102, and/or the like) may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The main memory 606 may, for example, include instructions to implement server instances, queuing modules, memory queues, storage queues, user interfaces, and/or other aspects of functionality of the present disclosure, according to various implementations.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), and/or the like, is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer-readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer-readable storage media may be involved in carrying one or more sequences of one or more computer-readable program instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

VIII. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method for determining and storing a retention policy for a transaction to a dataset, the computer implemented method comprising, by one or more hardware processors executing program instructions: storing a first dataset comprising a plurality of transactions, each of the plurality of transactions comprising one or more data items; receiving a first transaction to the first dataset, the first transaction comprising one or more data items; determining a first retention policy for the first transaction; and storing the first retention policy with the first transaction.

Clause 2: The computer-implemented method of Clause 1 further comprising, by the one or more hardware processors executing program instructions: calculating a deletion date for the first transaction based on the first retention policy; and storing the deletion date with the first transaction in the first dataset.

Clause 3: The computer-implemented method of Clause 2 further comprising, by the one or more hardware processors executing program instructions: deleting the first transaction based on the deletion date and/or the first retention policy.

Clause 4: The computer-implemented method of any of Clauses 1-3, wherein each of the plurality of transactions of the first dataset include associated retention policies and calculated deletion dates.

Clause 5: The computer-implemented method of any of Clauses 1-4 further comprising, by the one or more hardware processors executing program instructions: generating data useable for rendering a graphical user interface, the graphical user interface including at least one of: indications of deletion dates and/or retention policies associated with a plurality of datasets, or user input elements for creating or selecting a retention policy to apply to a dataset or transaction.

Clause 6: The computer-implemented method of any of Clauses 1-5 further comprising, by the one or more hardware processors executing program instructions: storing a creation date of the first transaction with the first transaction, wherein the creation date is usable for calculating a deletion date of the first transaction.

Clause 7: The computer-implemented method of Clause 1 further comprising, by the one or more hardware processors executing program instructions: determining that the first transaction is downstream from a second transaction; determining a second retention policy associated with the second transaction; and determining the first retention policy based at least in part on the second retention policy.

Clause 8: The computer-implemented method of Clause 7 further comprising, by the one or more hardware processors executing program instructions: calculating a deletion date for the first transaction based on a minimum deletion date associated with the first retention policy and the second retention policy; and storing the deletion date with the first transaction in the first dataset.

Clause 9: The computer-implemented method of any of Clauses 7-8, wherein the second transaction is in a second dataset different from the first dataset.

Clause 10: The computer-implemented method of any of Clauses 7-9, wherein: the first retention policy is at least one of: a time to live policy, or a fixed deletion date policy, and the second retention policy a different one of at least one of: a time to live policy, or a fixed deletion date policy.

Clause 11: The computer-implemented method of any of Clauses 7-10, wherein determining that the first transaction is downstream from the second transaction comprises: querying a data source or service using a unique identifier associated with the first transaction; and receiving, from the data source or service, information indicative of any upstream and downstream transactions or datasets associated with the first transaction, wherein the information includes an indication of the second transaction.

Clause 12: The computer-implemented method of any of Clauses 7-11 further comprising, by the one or more hardware processors executing program instructions: receiving an update to the second retention policy; and determining an update to the first retention policy in response to receiving the update to the second retention policy.

Clause 13: The computer-implemented method of Clause 12 further comprising, by the one or more hardware processors executing program instructions: in response to receiving the update to the second retention policy: querying a data source or service using a unique identifier associated with the second transaction; and receiving, from the data source or service, information indicative of any downstream transactions or datasets associated with the second transaction, wherein the information includes an indication of the first transaction.

Clause 14: The computer-implemented method of Clause 13 further comprising, by the one or more hardware processors executing program instructions: further in response to receiving the update to the second retention policy: identifying, based on the information indicative of any downstream transactions or datasets associated with the second transaction, the first dataset; and determining updates to retention policies associated with the plurality of transactions of the first dataset.

Clause 15: The computer-implemented method of Clause 14, wherein determining the updates to retention policies associated with the plurality of transactions of the first dataset comprises: querying a data source or service using the unique identifier associated with the first transaction; receiving, from the data source or service, information indicative of any upstream and downstream transactions or datasets associated with the first transaction, wherein the information includes an indication of the second transaction; and determining the update to the first retention policy based at least in part on the update to the second retention policy associated with the second transaction.

Clause 16: The computer-implemented method of any of Clauses 7-15, wherein the first retention policy is further based at least in part on a third retention policy associated with a third transaction from which the first transaction is also downstream.

Clause 17: The computer-implemented method of any of Clauses 7-16 further comprising, by the one or more hardware processors executing program instructions: receiving an override retention policy for the first transaction; and in response to receiving the override retention policy: severing a connection between the first transaction and the second transaction; and determining an update to the first retention policy based at least in part on the override retention policy.

Clause 18: The computer-implemented method of any of Clauses 7-16 further comprising, by the one or more hardware processors executing program instructions: determining a compatibility between the first retention policy and the second retention policy; and in response to determining the compatibility, severing a connection between the first transaction and the second transaction.

Clause 19: A system comprising: a computer readable storage medium having program instructions embodied therewith; and one or more processors configured to execute the program instructions to cause the system to perform the computer-implemented method of any of Clauses 1-18.

Clause 20: A computer program product comprising a computer-readable storage medium having program instructions embodied therewith, the program instructions executable by one or more processors to cause the one or more processors to perform the computer implemented method of any of Clauses 1-18.

What is claimed is:

1. A computer-implemented method for updating a retention policy for a transaction of a dataset, the computer-implemented method comprising, by one or more hardware processors executing program instructions:
   receiving a request to update a first retention policy associated with a first transaction of a plurality of transactions, each of the plurality of transactions comprising one or more data items;
   updating the first retention policy based on the request;
   storing the updated first retention policy in association with the first transaction;
   identifying, in a data source or service, information indicative of any downstream transactions or datasets associated with the first transaction, wherein the information includes an indication of a second transaction;
   accessing a second retention policy associated with the second transaction;
   updating the second retention policy based at least in part on the updated first retention policy; and
   storing the updated second retention policy in association with the second transaction.

2. The computer-implemented method of claim 1, wherein identifying, in the data source, information indicative of any downstream transactions or datasets further comprises, by the one or more hardware processors executing program instructions:
   querying the data source or service using a unique identifier associated with the first transaction, causing the data source or service to return the information indicative of any downstream transactions or datasets.

3. The computer-implemented method of claim 1 further comprising, by the one or more hardware processors executing program instructions:
   determining the first transaction is upstream from the second transaction.

4. The computer-implemented method of claim 1 further comprising, by the one or more hardware processors executing program instructions:
   accessing a deletion date associated with the first transaction;
   calculating an updated deletion date based on the updated first retention policy; and
   storing the updated deletion date in association with the first transaction.

5. The computer-implemented method of claim 1 further comprising, by the one or more hardware processors executing program instructions:
   accessing a second deletion date associated with the second transaction;
   calculating a second updated deletion date based on the updated second retention policy; and
   storing the second updated deletion date in association with the second transaction.

6. The computer-implemented method of claim 5 further comprising, by the one or more hardware processors executing program instructions:
   deleting the second transaction based on the second updated deletion date and/or the updated second retention policy.

7. The computer-implemented method of claim 5, wherein a first dataset includes a plurality of transactions, wherein the plurality of transactions includes the first transaction and the second transaction, and wherein each transaction of the plurality of transactions is associated with a retention policy and a calculated deletion date.

8. The computer-implemented method of claim 7 further comprising, by the one or more hardware processors executing program instructions:
   generating data useable for rendering a graphical user interface, the graphical user interface including at least one of:
      indications of deletion dates and/or retention policies associated with a plurality of datasets or transactions, or
      user input elements for creating or selecting a retention policy to apply to a dataset or transaction.

9. The computer-implemented method of claim 1, wherein the first transaction is in a first dataset, wherein the second transaction is in a second dataset, and wherein the first dataset is different from the second dataset.

10. The computer-implemented method of claim 1 further comprising, by the one or more hardware processors executing program instructions:

calculating a deletion date for the second transaction based on a minimum deletion date associated with the updated second retention policy and the updated first retention policy; and storing the deletion date in association with the second transaction.

11. The computer-implemented method of claim 1, wherein:

the updated first retention policy is at least one of: a time to live policy, or a fixed deletion date policy, and the updated second retention policy a different one of at least one of: a time to live policy, or a fixed deletion date policy.

12. The computer-implemented method of claim 1 further comprising, by the one or more hardware processors executing program instructions:

in response to updating the second retention policy:

querying a second data source or service using a unique identifier associated with the second transaction; and receiving, from the second data source or service, information indicative of any downstream transactions or datasets associated with the second transaction, wherein the information includes an indication of a third transaction, wherein the third transaction was not previously identified as a downstream transaction in the data source or service.

13. The computer-implemented method of claim 12 further comprising, by the one or more hardware processors executing program instructions:

accessing a third retention policy associated with the third transaction in the second data source or service;

updating the third retention policy based on the updated first retention policy; and storing the updated third retention policy in association with the third transaction.

14. The computer-implemented method of claim 1, wherein the information indicative of any downstream transactions or datasets associated with the first transaction includes an identifier for a first dataset, and wherein the computer-implemented method further comprises, by the one or more hardware processors executing program instructions:

accessing a plurality of retention policies of the first dataset;

updating the plurality of retention policies based at least in part on the updated first retention policy; and storing each of the updated plurality of retention policies in association with an associated transaction of a plurality of transactions included in the first dataset.

15. The computer-implemented method of claim 1 further comprising, by the one or more hardware processors executing program instructions:

identifying, in the data source or service, information indicative of any upstream transactions or datasets associated with the first transaction, wherein the information includes an indication of a third transaction; and accessing a third retention policy associated with the third transaction, wherein updating the second retention policy is further based at least in part on the third retention policy.

16. The computer-implemented method of claim 1 further comprising, by the one or more hardware processors executing program instructions:

determining a compatibility between the updated first retention policy and the second retention policy; and in response to determining the compatibility, severing a connection between the first transaction and the second transaction.

17. The computer-implemented method of claim 1, wherein the request to update the first retention policy includes an override policy, and wherein updating the second retention policy includes severing a connection between the first transaction and the second transaction.

18. The computer-implemented method of claim 1, wherein the updated second retention policy indicates the second transaction is to be deleted, and wherein the computer-implemented method further comprises, by the one or more hardware processors executing program instructions:

deleting the second transaction.

19. A system comprising:

one or more computer-readable storage mediums storing program instructions; and one or more processors configured to execute the program instructions to cause the system to:

receive a request to update a first retention policy associated with a first transaction of a plurality of transactions, each of the plurality of transactions comprising one or more data items;

update the first retention policy based on the request;

storing the updated first retention policy in association with the first transaction;

identify, in a data source or service, information indicative of any downstream transactions or datasets associated with the first transaction, wherein the information includes an indication of a second transaction;

access a second retention policy associated with the second transaction;

update the second retention policy based at least in part on the updated first retention policy; and store the updated second retention policy in association with the second transaction.

20. A computer program product comprising one or more computer-readable storage mediums storing program instructions, the program instructions executable by one or more processors to:

receive a request to update a first retention policy associated with a first transaction of a plurality of transactions, each of the plurality of transactions comprising one or more data items;

update the first retention policy based on the request;

storing the updated first retention policy in association with the first transaction;

identify, in a data source or service, information indicative of any downstream transactions or datasets associated with the first transaction, wherein the information includes an indication of a second transaction;

access a second retention policy associated with the second transaction;

update the second retention policy based at least in part on the updated first retention policy; and store the updated second retention policy in association with the second transaction.

* * * * *